US007373382B2

(12) United States Patent
Nakai et al.

(10) Patent No.: US 7,373,382 B2
(45) Date of Patent: May 13, 2008

(54) ELECTRONIC APPARATUS, INFORMATION COMMUNICATIONS APPARATUS, MANAGEMENT SYSTEM FOR SAME ELECTRONIC APPARATUS, AND MANAGEMENT METHOD FOR SAME ELECTRONIC APPARATUS

(75) Inventors: Yasuhiro Nakai, Soraku-gun (JP); Masakatsu Nakamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 913 days.

(21) Appl. No.: 09/969,407

(22) Filed: Oct. 2, 2001

(65) Prior Publication Data

US 2002/0056015 A1    May 9, 2002

(30) Foreign Application Priority Data

Oct. 3, 2000   (JP)   ............................ 2000-304145
Dec. 6, 2000   (JP)   ............................ 2000-372043

(51) Int. Cl.
  *G06F 15/16*    (2006.01)
  *G06F 15/173*   (2006.01)
(52) U.S. Cl. ........................ 709/206; 709/207; 709/224
(58) Field of Classification Search ................ 709/206, 709/224; 714/25, 1, 37
  See application file for complete search history.

(56) References Cited

U.S. PATENT DOCUMENTS 6,128,603 A *  10/2000  Dent et al. .................... 705/40
6,223,168 B1 *   4/2001  McGurl et al. ................ 705/40
6,405,243 B1 *   6/2002  Nielsen ........................ 709/206
6,405,245 B1 *   6/2002  Burson et al. ............... 709/217
6,438,691 B1 *   8/2002  Mao ............................ 713/176
6,473,788 B1 *  10/2002  Kim et al. ................... 709/209
6,493,685 B1 *  12/2002  Ensel et al. .................... 705/40
6,519,552 B1 *   2/2003  Sampath et al. ............ 702/183
6,581,092 B1 *   6/2003  Motoyama et al. ......... 709/219
6,591,296 B1 *   7/2003  Ghanime ..................... 709/224
6,651,190 B1 *  11/2003  Worley et al. .............. 709/224

(Continued)

FOREIGN PATENT DOCUMENTS

JP        02-039248        2/1990

(Continued)

*Primary Examiner*—Jason D Cardone
*Assistant Examiner*—Jeffrey R Swearingen
(74) *Attorney, Agent, or Firm*—David G. Conlin; David A. Tucker; Edwards Angell Palmer & Dodge LLP

(57) ABSTRACT

A management system of the present invention is provided with an electronic apparatus having a specific function, such as a digital composite machine, an information management apparatus, and a plurality of service information terminals. The information management apparatus and a plurality of the service information terminals are linked with the electronic apparatus via a network. After the operation of the digital composite machine, which has been serviced, is resumed after the service, operational information is prepared, for example, by inputting operating condition information into an operation panel in accordance with a determination made by a user, so as to transmit the operational information to the information management apparatus. The information management apparatus uses the operational information, at least as a reference for determining whether or not it is necessary to the service, so as to instruct the service information terminal to repeat the service, for example. In this way, it is possible to provide a management system and a management method for the electronic apparatus, which appropriately manages the electronic apparatus by advantageously utilizing the characteristics of E-mail.

32 Claims, 21 Drawing Sheets

U.S. PATENT DOCUMENTS

| | | | |
|---|---|---|---|
| 6,681,344 B1 * | 1/2004 | Andrew | 714/38 |
| 6,697,969 B1 * | 2/2004 | Merriam | 709/224 |
| 6,701,095 B1 * | 3/2004 | Fujimoto et al. | 399/9 |
| 6,775,705 B2 * | 8/2004 | Maeda | 709/230 |
| 6,823,367 B1 * | 11/2004 | Wakasugi et al. | 709/206 |
| 6,857,013 B2 * | 2/2005 | Ramberg et al. | 709/223 |
| 6,889,263 B2 * | 5/2005 | Motoyama | 710/15 |
| 6,915,342 B1 * | 7/2005 | Motoyama | 709/224 |
| 6,970,952 B2 * | 11/2005 | Motoyama | 710/15 |
| 7,281,040 B1 * | 10/2007 | Ly | 709/206 |

FOREIGN PATENT DOCUMENTS

| | | |
|---|---|---|
| JP | 04-017457 | 1/1992 |
| JP | 04-337842 | 11/1992 |
| JP | 05-233578 | 9/1993 |
| JP | 06-320845 | 11/1994 |
| JP | 07-084812 | 3/1995 |
| JP | 08-115125 | 5/1996 |
| JP | 2707459 | 10/1997 |
| JP | 10-190920 | 7/1998 |
| JP | 11-252670 | 9/1999 |
| JP | 2000-059465 | 2/2000 |

* cited by examiner

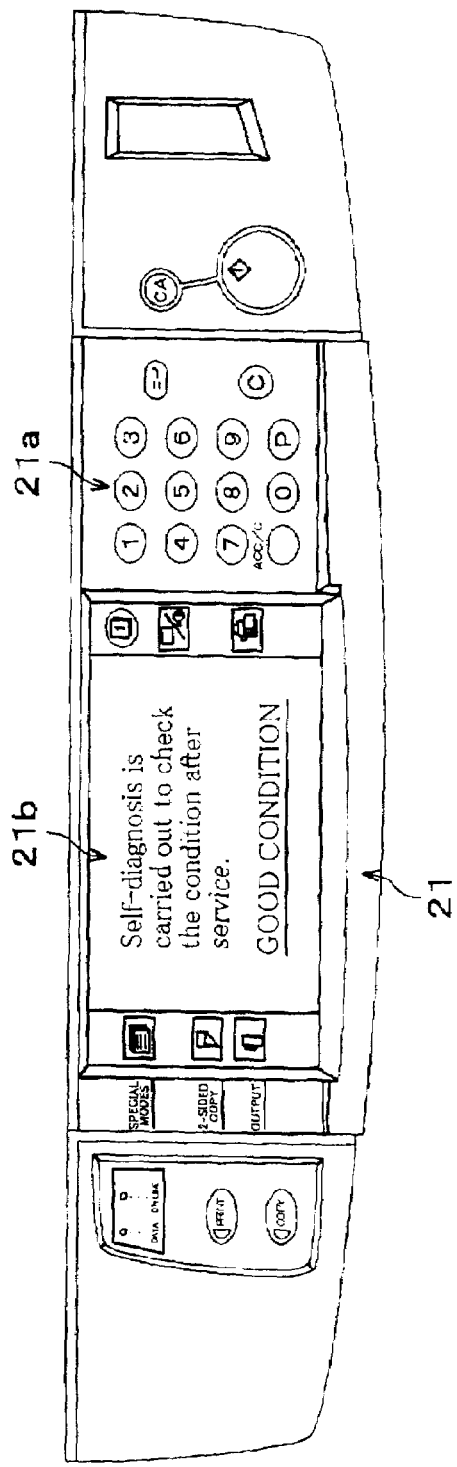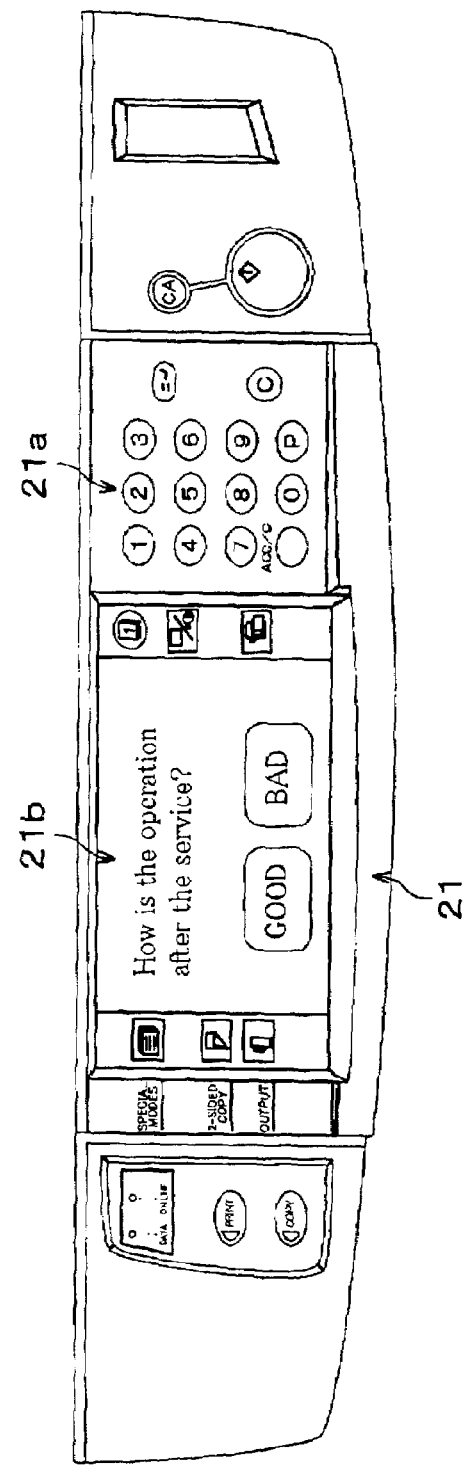
FIG. 8 (a)
FIG. 8 (b)

FIG. 15

SHEET-FEEDING INFORMATION
(JAM FREQUENCY LOG)

| SHEET-FEEDING CONDITION FOR LAST 100 SHEETS | FIRST CASSETTE | SECOND CASSETTE | THIRD CASSETTE | .... |
|---|---|---|---|---|
| JAM OCCURRENCE TIMES (SHEET) | 20 | 0 | 0 | .... |
| JAM FREQUENCY (%) | 20 | 0 | 0 | .... |

FIG. 16

SHEET-FEEDING INFORMATION
(JAM FREQUENCY LOG)

| SHEET-FEEDING CONDITION FOR LAST 100 SHEETS | FIRST CASSETTE | SECOND CASSETTE | THIRD CASSETTE | .... |
|---|---|---|---|---|
| JAM OCCURRENCE TIMES (SHEET) | 20 | 0 | 40 | .... |
| JAM FREQUENCY (%) | 20 | 0 | 40 | .... |

FIG. 17
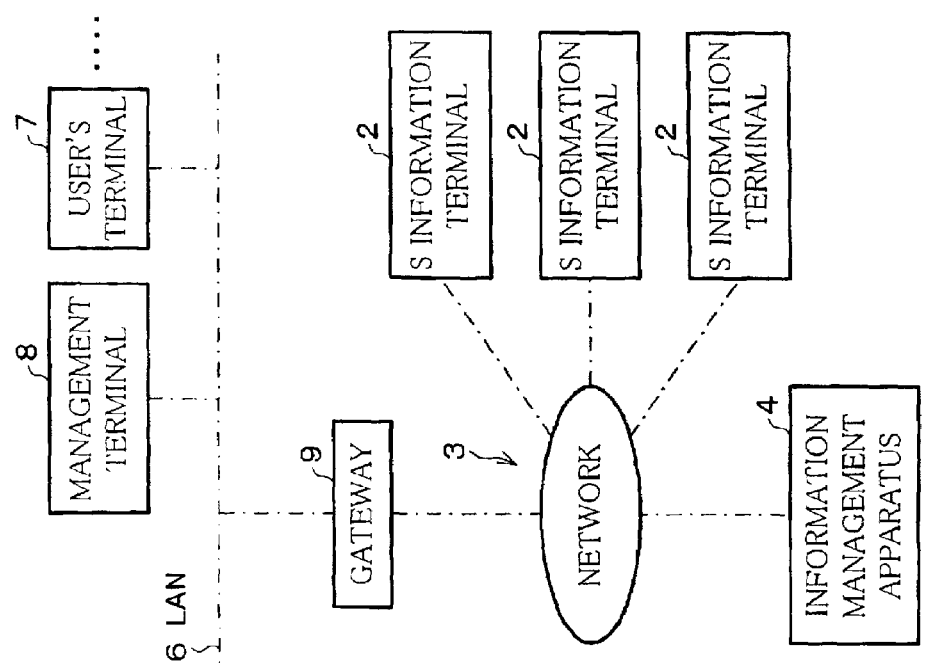
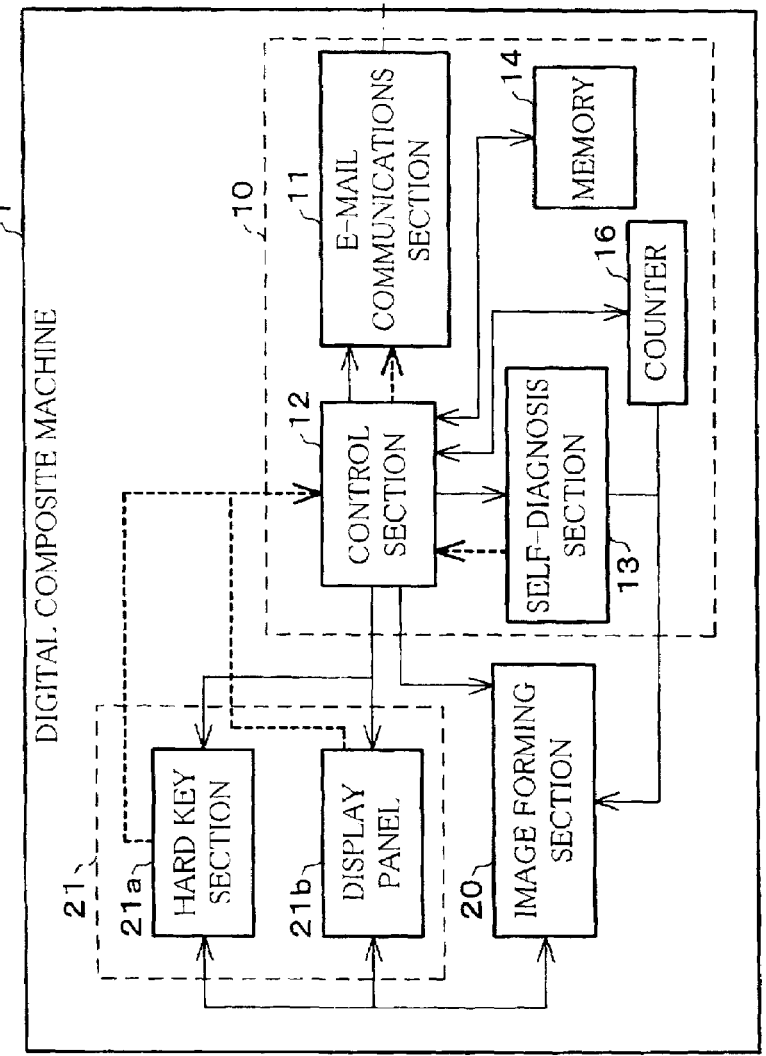

FIG. 18

PRINTER TROUBLE
RECEIVING END

| TROUBLE \ RECEIVING END | MANAGER | SERVICE CENTER | USER |
|---|---|---|---|
| NO PRINTER BOARD IS DETECTED | ○ | ○ | |
| UNEXPENDED FUNCTION IS SET AT PRINTER DRIVER | ○ | | ○ |
| MEMORY OVERCAPACITY: DATA CANNOT BE PROCESSED | ○ | ○ | ○ |

ELECTRONIC APPARATUS, INFORMATION COMMUNICATIONS APPARATUS, MANAGEMENT SYSTEM FOR SAME ELECTRONIC APPARATUS, AND MANAGEMENT METHOD FOR SAME ELECTRONIC APPARATUS

FIELD OF THE INVENTION

The present invention relates to an electronic apparatus, and an information communications apparatus, a management system, and a management method for use with the electronic apparatus. More particularly, the present invention relates to an electronic apparatus such as an image forming apparatus that requires highly technical repair and/or maintenance service to be performed by trained service personnel. Further, the present invention relates to an information communications apparatus, a management system, and a management method for use with the electronic apparatus, which are able to automatically provide various information helpful in carrying out the technical service.

BACKGROUND OF THE INVENTION

Recently, various attempts have been made to provide additional functions in a network (for example, a LAN) structured by connecting a computer, a printer, and various other electronic apparatuses in addition to the standard functions of transmitting and receiving information via the network. In particular, these additional functions have included several technologies for managing an electronic apparatus effectively by means of E-mail.

For example, Japanese Patent Publication No. 2707459 (Japanese Un-Examined Patent Application, Tokukaihei, No. 2-172348: published on Jul. 3, 1990) discloses a facsimile apparatus provided with interface means having an E-mail function that connects, the facsimile apparatus with a network.

In this case, a sender (a user sending information) of image information inputs identification information used in the computer network as his sender's identification information (sender's ID information). Upon the completion of the transmission of the image information by a sending facsimile apparatus, the sending facsimile apparatus prepares transmission result report information that reports the result of the transmission and thereafter sends the transmission result report information in a form of E-mail addressed to the sender's ID information via the computer network. Furthermore, in case the receiving facsimile apparatus, when identification information (receiver's ID information) of a receiver (a user receiving the transmitted information) is input into the computer network before the transmission of the image information, the receiving facsimile apparatus prepares receipt result report information that reports a receipt result after completion of its receipt of the image information and thereafter sends the receipt result report information in a form of E-mail addressed to the receiver's ID information via the computer network, at the same time that the transmission result report information is sent to the sender's I.D. information via the computer network.

With this arrangement, when a facsimile message is transmitted or received by the facsimile apparatus of a user that is connected to the computer network, a transmission result or a receipt result is automatically sent to the sender and/or to the receiver from his facsimile apparatus. This allows the sender and the receiver to surely obtain information regarding the transmission or the receipt of the image information by their associated facsimile apparatus by checking for the receipt of an E-mail at their respective computers, without the necessity going to the location at which their associated the facsimile apparatus is located.

Moreover, Japanese Un-Examined Patent Application, Tokukai, No. 2000-181302 (published on Jun. 30, 2000) discloses an image forming apparatus management system, in which a plurality of image forming apparatuses and a central management apparatus equipped with a computer are connected via a public communication network, a communication adaptor, and a wire or wireless interface, such that the central management apparatus can perform central management of each image forming apparatus.

This image forming apparatus management system has as its main objects a reduction in (a) the required number of communication lines, (b) the communication period and (c) communication charges, in addition to a shortening of the processing time of the central management apparatus. To achieve these objects, each image forming apparatus is provided with data management means, and a management terminal to be connected to the communication adaptor is provided with data recording means, data processing means and data transmission mean for reporting a no data acquisition condition. Further, the central management apparatus is provided with data transmission means for reporting a service request.

The image forming apparatus uses data management means provided therein to manage usage information of the image forming apparatus, and to output response data that shows the usage information, upon receipt of data reading instructions from the management terminal.

The management terminal first records in a data recording means information on the types of the image forming apparatuses connected to the network, usage information of each image forming apparatus, and associated data including a data collection date or a data accumulation date. Then, the management terminal automatically sends data reading instructions to the respective image forming apparatuses on their associated data collection date or their associated data accumulation date, or a few days before. The data processing means collects or accumulates the response data respectively outputted from the data management means of each image forming apparatus. Meanwhile, if no response data is acquired from a particular image forming apparatus, the data transmission means for reporting no data acquisition automatically sends reporting data for reporting that no data acquisition to the central management apparatus.

The central management apparatus is arranged to use the network data transmission means to automatically send, to outside, reporting data requesting service in order to find the cause that has prevented the management terminal from acquiring response data from particular ones of the image forming apparatuses, or all of the image forming apparatuses, and to receive repair service, when the central management apparatus receives the reporting data for reporting no data acquisition. The transmission of the reporting data also can be carried out via E-mail.

The above arrangement, where the management terminal collects and accumulates response data from each image forming apparatus on predetermined data collection dates or data accumulation dates, reduces the number of required communication line, the communication period, and also shortens operation time (for example, the data processing time of the central management apparatus). Moreover, when no response data is acquired, the data for reporting no data acquisition is automatically sent to the central management apparatus, so that the central management apparatus automatically requests a service department, for example via E-mail as mentioned above, to perform the service required to find the cause that is preventing the data acquisition. This makes it possible to solve the problem of no data acquisition in a short time.

E-mail is advantageous in the situation just discussed, for example, because: its transmission time is relatively short; it is easy to reply E-mail; it is simple to save and reuse E-mail data; and E-mail can be transmitted or received regardless of situation of the receiver of the apparatus requiring service. Therefore, it is known that the advantages of E-mail may be utilized to manage an electronic apparatus, but no method of managing an electronic apparatus, which effectively utilizes the advantages of E-mail for that purpose, has been suggested.

For example, in the technology disclosed in Japanese Patent Publication No. 2707459, E-mail, as a subsidiary means to a facsimile apparatus, is utilized for informing a result of transmission and/or reception that has been performed by a facsimile apparatus—that is, simply for sending to a personal computer the result of the transmission and reception performed by the facsimile apparatus.

Similarly, in the technology disclosed in Japanese Un-Examined Patent Application, Tokukai, No. 2000-181302, E-mail is used only for communications between a central management apparatus and a service department (i.e., E-mail is used only when a trouble condition such as no data being acquired is encountered).

Therefore, in the technologies disclosed in the applications and Publications referred to above, E-mail does not play a principal role in the management of the electronic apparatus. Therefore, those applications fail to utilize E-mail effectively.

Furthermore, even when E-mail has been utilized in the art, there is no significant difference between a conventional management method without using E-mail and the management method in which E-mail is used in those situations in which the use of E-mail is limited to simple transmission of information. Further, in addition to those advantages mentioned above, E-mail has another advantage that E-mail realizes a fast and sure communication with a remote location. Therefore, it is expected that E-mail can be utilized in a management system for a sure management of an electronic apparatus at a remote location. However, the simple use of E-mail discussed above cannot realize a satisfactory remote management system.

For example, where a management system is provided with an electronic apparatus such as an image forming apparatus to send an E-mail from the image forming apparatus to a manager (a service provider), the manager receives an E-mail message indication reading "no paper" or "no toner" from the image forming apparatus. In this way, the manager can supply paper or toner in accordance with the notice, or can manage consumptive goods such as paper or toner so that he can place an order for the consumptive goods (for example, by telephone), if necessary, in accordance with the notice. In this case, however, the use of E-mail makes no significant improvement in the art, thereby failing to make a significant difference from the conventional management method or management system.

Therefore, even if E-mail is used to communicate in a management system for managing an electronic apparatus, the management system is not a remote management system that enables the service provider to respond (i.e., deal with) surely to the needs of the electronic apparatus with much consideration of the needs of the user.

In addition, in the technology disclosed in Japanese Un-Examined Patent Application, Tokukai, No. 2000-181302, the service is provided only in those cases where no response data is acquired from the image forming apparatus. Thus, service is provided without determining whether the image forming apparatus itself has a problem in terms of maintenance, or the image forming apparatus has experienced a trouble event adversely impacting its future operation. In short, the main objects of the prior art are reducing the number of the communication lines, the communication period, and the data processing time, but that technology is insufficient for the provision of proper service to effectively solve the problems encountered by an electronic apparatus.

Therefore, the above technologies are inadequate as a management system for the electronic apparatus, such as the image forming apparatus that requires intensive service in terms for its correct maintenance.

SUMMARY OF THE INVENTION

An object of the present invention is to provide an electronic apparatus that is properly managed by taking full advantage of E-mail, an information communication apparatus that can be linked with the electronic apparatus, a management system and a management method for the electronic apparatus that can properly manage the electronic apparatus.

In order to attain the foregoing objects, an electronic apparatus in accordance with the present invention is provided with (I) an apparatus communication section for transmitting an electronic mail to a predetermined receiving end that is linked with the apparatus communication section via a network, (II) an operational information preparation section, including ① an operational condition checking section for checking the operational condition of a specific function of the electronic apparatus after that function of the electronic apparatus has been serviced, and ② a preparation section for preparing operational information that indicates the operational condition that has been checked by the operational condition checking section, and (III) a control section (a) for controlling the operational information preparation section so as to prepare operational information after operation of the specific function is resumed following the provision of service, and (b) for controlling the apparatus communication section so as to transmit the operational information to the predetermined receiving end.

In order to achieve the forgoing objects, an electronic apparatus of the present invention is provided with (I) an apparatus communication section for transmitting an electronic mail to a predetermined receiving end that is linked with the apparatus communication section via a network, (II) an operational information preparation section, including ① an operational condition checking section for checking the operational condition of a part of the electronic apparatus, which has been renewed (replaced) in terms of a specific function of the electronic apparatus, and ② a preparation section for preparing operational information that indicates the operational condition that has been checked by the operation condition checking section, and (III) a control section (a) for controlling the operational information preparation section so as to prepare the operational information after operation of the specific function of the electronic apparatus is resumed after the renewal (replacement) of a part, and (b) for controlling the apparatus communication section so as to transmit the operational information to the predetermined receiving end.

Further in order to achieve the forgoing objects, an electronic apparatus of the present invention, which is capable of expanding its function by the attachment of an optional unit thereto, is provided with (I) an apparatus communication section for transmitting an electronic mail to a predetermined receiving end that is linked with the apparatus communication section via a network, (II) a detecting section for detecting the attachment of the optional unit, (III) an operational information preparation section, including ① an operation condition checking section for checking the operational condition of the function of the optional unit in terms of a specific function thereof, and ② a preparation section for preparing operational information that indicates the operational condition that has been checked by the operation condition checking section, and (IV) a control section (a) for controlling the operational information preparation section so as to prepare the operational information after the attachment of the unit is detected and operation of the specific function of the optional unit is resumed, and (b) for controlling the apparatus communication section so as to transmit the operational information to the predetermined receiving end.

These arrangements prepare the operational information in accordance with the operation of the electronic apparatus after the service, the renewal (replacement) of the part, or the attachment of the optional unit, so that the control section sends the operational information to a predetermined receiving end by E-mail.

Thus, if the manager (such as a service center or service personnel), who manages the electronic apparatus, is set as the receiving end for the operational information, it possible (a) to check surely whether or not the service, the renewal (replacement) of the part or the attachment of the optional unit has been appropriately carried out, and (b) to respond promptly to a trouble condition experienced by the electronic apparatus, if any, even after the service, the renewal (replacement) of the part, and the attachment of an optional unit, thereby achieving better serviceability.

Moreover, in those cases in which the operational information is transmitted after an optional unit has been attached to the electronic apparatus, it is possible to use E-mail to inform a user who utilizes the function of the optional unit of that availability of the electronic apparatus including that function, when such a user is set as a receiving end. This makes it possible to give timely notice to users about an expansion of the functional capabilities of the electronic apparatus and to effectively encourage such users to utilize that function.

On the other hand, an information communication apparatus in accordance with the present invention is capable of being externally connected an electronic apparatus having a specific function. The information communication apparatus includes (I) a communication section connected with a network, that transmits information to a predetermined receiving end by electronic mail, (II) a control section that controls the transmission of information in accordance with operation of the electronic apparatus, and (III) an operational information preparation section for preparing operational information indicative of the operational condition of the electronic apparatus. The control section (a) controls the operational information preparation section so as to prepare the operational information after operation of the specific function is resumed following servicing of the electronic apparatus, and (b) controls the communication section so as to transmit the operational information to the predetermined receiving end.

The above arrangement prepares the operational information in accordance with the operation of the electronic apparatus following the performance of service so that the control section sends the operational information to a predetermined receiving end via E-mail. Therefore, if the manager of the electronic apparatus is set as the receiving end for the operational information, it possible for the manager to check surely whether a service provision has been appropriately carried out or not, and to respond promptly to a trouble event, if any, even after service has been provided, thereby improving the serviceability of the electronic apparatus.

For a fuller understanding of the nature and advantages of the present invention, reference should be made to the following detailed description taken in conjunction with the accompanying drawings in which:

BRIEF DESCRIPTION OF THE DRAWINGS

FIG. 8(a) is an explanatory view illustrating an operation panel when operational information obtained by self-diagnosis is prepared in advance as operational information.

FIG. 8(b) is an explanatory view showing an operation panel when operational information is prepared by a user who has judged a result of a provision of service.

FIG. 15 is an explanatory view illustrating a jam frequency log stored in a memory of a digital composite machine in a management system for an electronic apparatus in accordance with a ninth embodiment of the present invention.

FIG. 16 is an explanatory view showing a jam frequency log when more than one trouble condition (event) is recognized by the management system for the electronic apparatus.

FIG. 17 is a block diagram showing an example in which a management system for an electronic apparatus of a tenth embodiment of the present invention is employed for managing a digital composite machine.

FIG. 18 is an explanatory view illustrating a receiving end for a printer trouble condition that is stored in a memory of the digital composite machine in the management system for the electronic apparatus.

DESCRIPTION OF PREFERRED EMBODIMENTS

First Embodiment

A first embodiment of the present invention is described below with respect to FIGS. 1 and 2. It is to be noted that the present invention is not limited to this first preferred embodiment or to any of the other preferred embodiments discussed herein.

In a management system for an electronic apparatus of the present invention, operational information, which indicates how good the operation of the electronic apparatus is (i.e., an operational condition of the electronic apparatus) is prepared upon the resumption of a specific function by the electronic apparatus following the performance of service on or in connection with the electronic apparatus. Then, the operational information is sent to a predetermined receiving end. Further, the predetermined receiving end uses the operational information, at least, as a judgment reference for determining whether or not further service is required.

In the present embodiment, an image forming apparatus of a digital composite type is described as an example of electronic apparatuses that have a specific function and which utilize a management system of the present invention in conjunction with the electronic apparatus. An image forming apparatus of the digital composite type has at least two operation modes, for example, a copy mode, and/or a facsimile mode and/or a printer mode. Hereinafter, the image forming apparatus is sometimes referred to as a digital composite machine.

Image forming apparatuses frequently experience various trouble conditions (events) such as deterioration of the output image, or a jam caused by one or more sheets of a reproduction medium (i.e., a paper jam). Further, image-forming apparatuses often require the management of consumptive goods such as toner, utilized in, or in connection with, the apparatus. The management system of the present invention is particularly suited for the above operational problems, among others, encountered by image forming apparatuses that requires the intervention of intensive, trained service.

Figure 1:
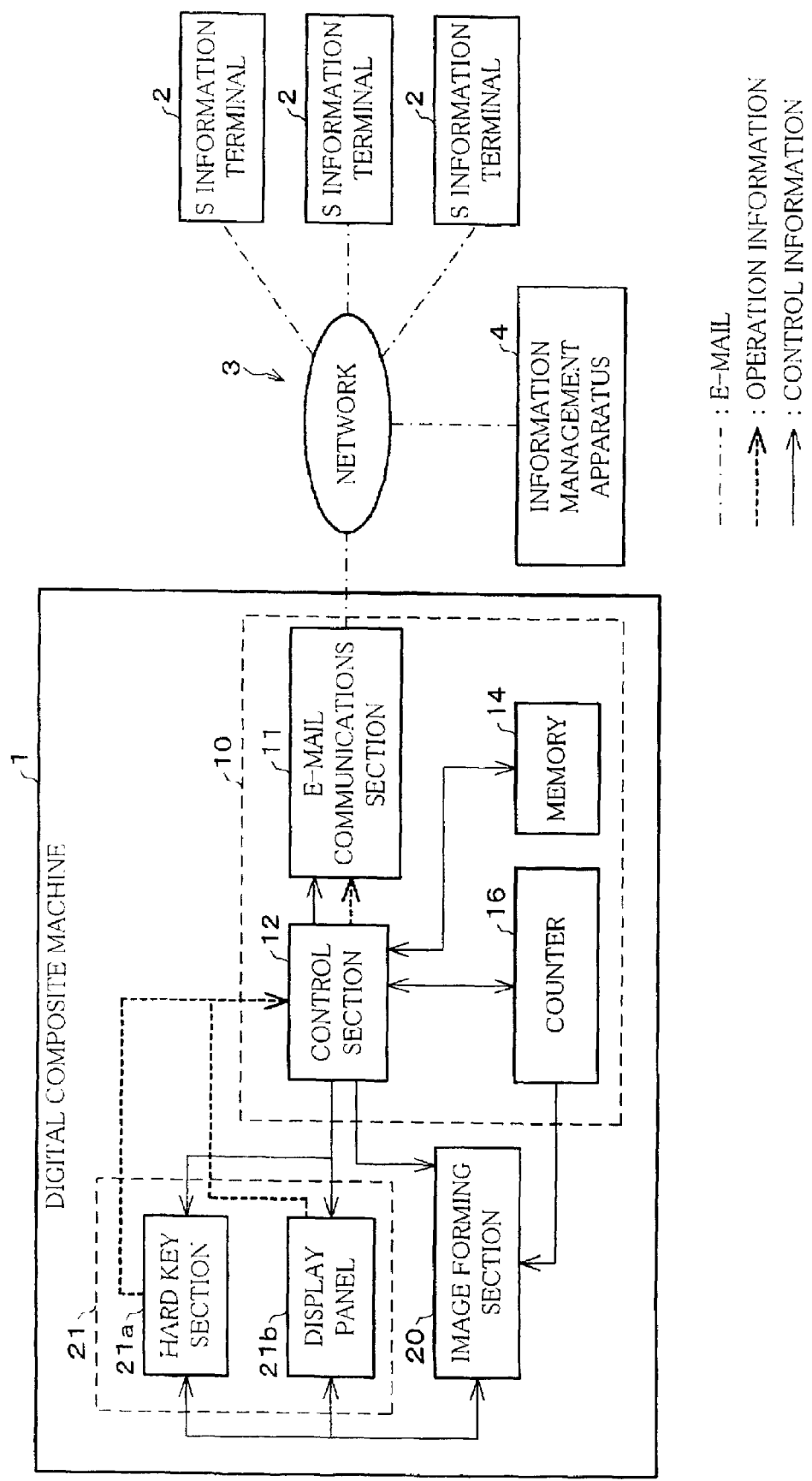
FIG. 1 is a block diagram showing an example where a management system of an electronic apparatus of a first embodiment of the present invention is employed for managing a digital composite machine.

The management system of the present invention for the digital includes a digital composite machine 1, an information management apparatus 4, and a service personnel information terminal 2 (hereinafter, denoted as an S information terminal), as shown in FIG. 1. The information management apparatus 4 and the service personnel information terminal 2 are connected via a network 3 with the digital composite machine 1. The information management apparatus 4 is a primary receiving end, while the S information terminal 2 is a secondary receiving end. The management system may be provided with only one S information terminal 2, but plural S information terminals (three are provided in FIG. 1) are provided in the present embodiment as shown in FIG. 1.

The digital composite machine 1 is provided with a built-in information communication section (information communication means) 10, that connects the digital composite machine 1 to a network 3, such as Internet.

The information communication section 10, which is connected to the network 3, is provided with an E-mail communication section (machine communication means; notifying means; trouble notifying means) 11, a control section (control means) 12, a memory (storing means) 14, and a counter (counting means) 16. The E-mail communication section 11 transmits information to a predetermined receiving end via E-mail, while the control section 12 controls the E-mail transmissions in accordance with the operation of an image forming section of the digital composite machine 1.

The E-mail communication section 11 transmits machinery information, which will be discussed later, to a predetermined receiving end (the information management apparatus 4) via E-mail. The control section 12 controls the E-mail transmission of operational information, which has been inputted via an operation panel 21, to the predetermined receiving end (the information management apparatus 4) as will be discussed later, while controlling operation of the whole digital composite machine 1, as a machine control section. Thus, in the present embodiment, the control section 12 controls not only the information communications section 10, but also controls, as a machine control section, the operation of the whole digital composite machine 1.

In the memory 14, various pieces of information concerning the control of the preparation of the machine information and the control of the E-mail transmission are stored. Further, the counter 16 counts how many times the image forming section 20 forms an image.

The digital composite machine 1 also is provided with various other means and sections, including the image forming section 20 that allow the digital composite machine 1 to function as an image forming apparatus. In FIG. 1, for convenience of the explanation, only the image forming section 20 and the operation panel 21 are shown. However, it is to be understood that the digital composite machine 1 is not limited to this arrangement, and may include various additional means and sections that are commonly provided in well-known image forming apparatuses.

The operation panel 21 is provided with a hard key section 21a and a display panel 21b. The hard key section 21a and the display panel 21b are connected to the image forming section 20 and the information communications section 10 (and therefore, the control section 12) so as to perform various input operations in regard to the operation of the digital composite machine 1. In particular, the operation panel 21 is, as will be discussed further later, capable of receiving operational information indicating the operational condition of the digital composite machine 1. For this reason, in the present invention, the operation panel 21 is not merely an input means, but also functions as an operational information preparation means (an operation condition checking section and preparation means) that prepares operational information in accordance with an input of operational information on the operational condition of the digital composition machine 1.

Figure 2:
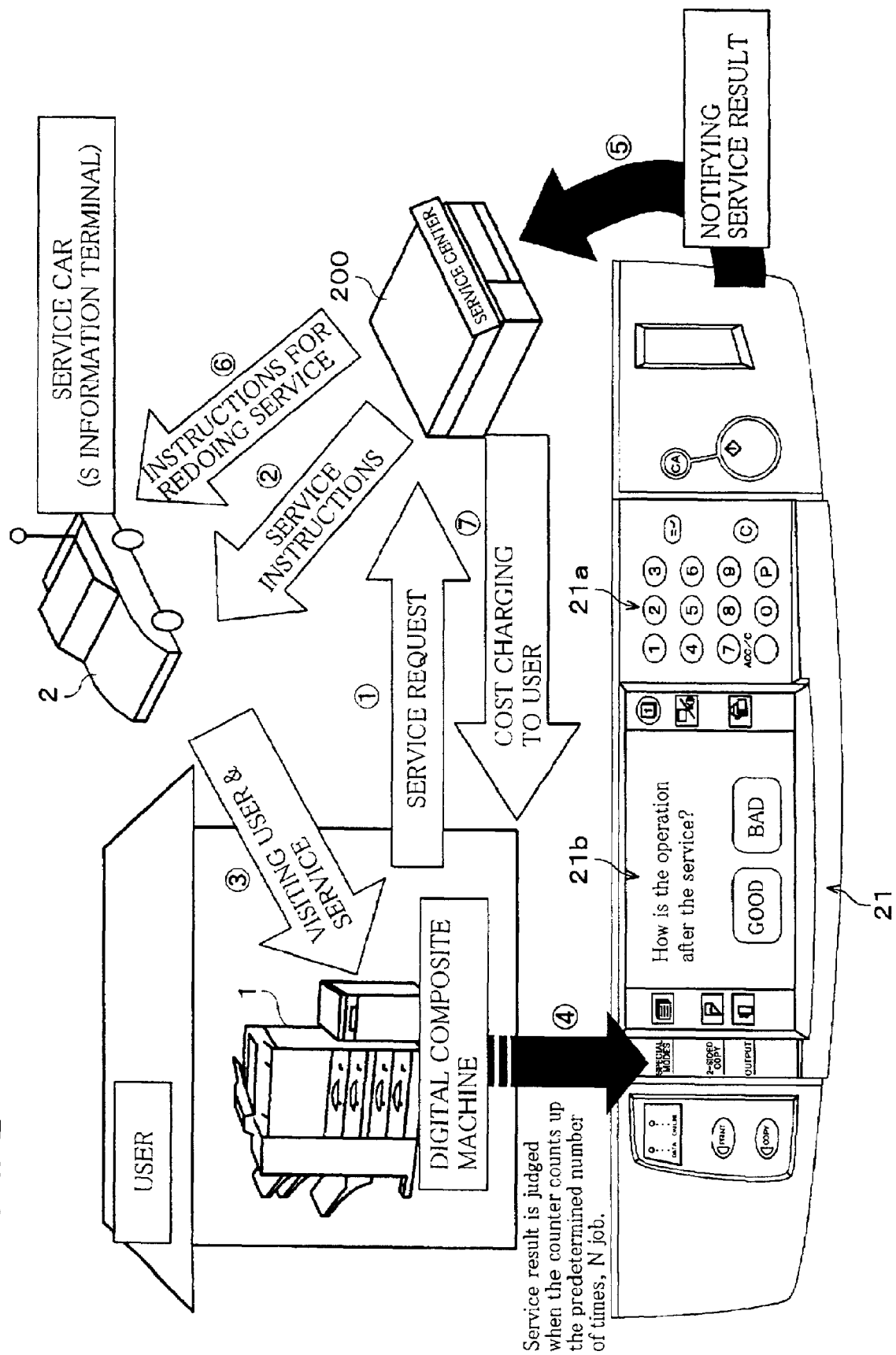
FIG. 2 is an explanatory view illustrating how operational information is prepared and transmitted and how service is provided to a user in the management system shown in FIG. 1.

As shown in FIG. 2, the hard key section 21a is structured with ten number keys and other keys (such as a start key and a clear key) so that various information can be inputted by typing.

The display panel 21b can display various information regarding the input operation and the E-mail transmission in accordance with control by the control section 12. The display panel 21b can be used as input means as well as the display means because the display panel 21b in this embodiment is a touch panel. In other words, the display panel 21b can display a key that is operative directly on the display (hereinafter denoted as a soft key) so that various information can be inputted by operating the soft key. Furthermore, the display panel 21b functions as notifying means and trouble event notifying means that notify the user, at the location where the digital composite machine 1 is installed, whether or not a specified function of the digital composite machine 1 is operating normally.

It should be noted in the above regard that, the present invention is not limited to the present embodiment in which the operational information preparation means is the operation panel 21 provided with the hard key section 21a and the display panel 21b, but rather may include other means apart from the operation panel 21.

With the information management apparatus 4, it is possible to transmit information by E-mail via the network 3 to the S information terminals 2 as secondary receiving ends. Specifically, the information management apparatus 4 receives operational information transmitted from the digital composite machine 1, and instruction information is prepared based on the operational information. That instruction information is transmitted to the S information terminals 2 by E-mail.

In the present embodiment, the operational information, which is transmitted from the digital composite machine 1, relates to the operational condition of the digital composite machine 1 following a provision of service (support and maintenance) thereto (i.e., a service result). Moreover, upon the receipt of, and based upon the content of, the service result, the information management apparatus 4 transmits instructions concerning the re-performance of a service event as the instruction information, to a predetermined S information terminal 2.

In this respect it is to be noted that, in FIG. 1, the bold chain line indicates a transmission path of an E-mail transmitted via the network 3, while the bold dotted-line arrow indicates an output path of the operational information. The thin-line arrow shows an output path of control information regarding the control of the digital composite machine 1 (including the display information regarding the display of the display panel 21b, and a counting result indicative of a number of times that the image forming operation has been performed).

Figure 13:
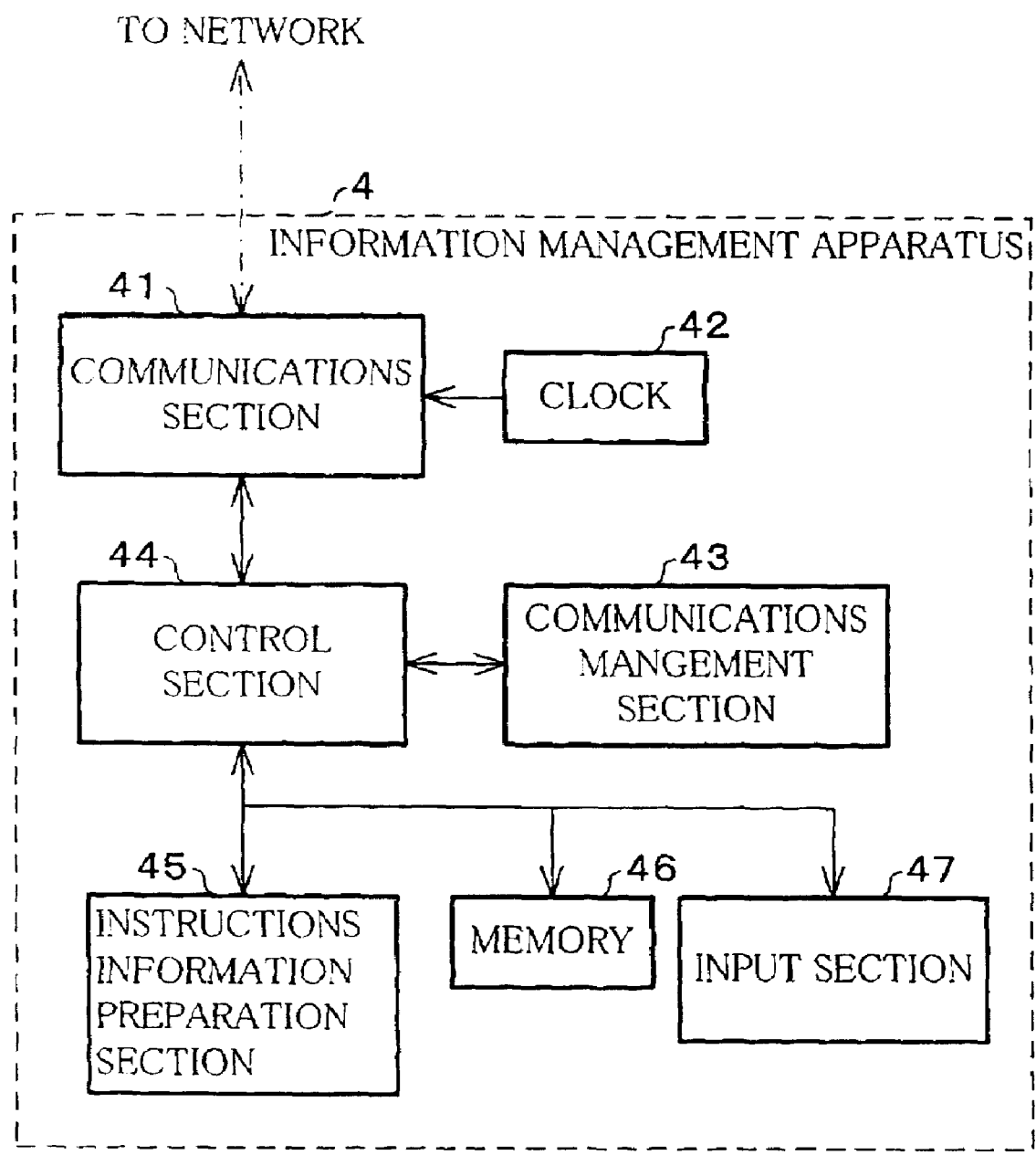
FIG. 13 is a block diagram showing a main configuration of an information management apparatus in the management system for an electronic apparatus in accordance with the first embodiment of the present invention.

For example as shown in FIG. 13, the information management apparatus 4 is provided with a communication section 41, a clock 42, a communication management section 43, a control section 44 and an instruction information preparation section 45. The communication section 41 transmits and receives E-mail via the network 3. The clock 42 is used for acquiring the time and date that the E-mail is transmitted and received. In the communication management section 43, information is stored regarding communications between the communication management section 43 and the digital composite machine 1 or the S information terminal 2. For example, such communications may include (a) operation information that has been received from the digital composite machine 1 by E-mail, (b) instruction information that has been transmitted to the S information terminal 2 by E-mail, (c) a history of previous services, or (d) addresses of the digital composite machine 1 and the S information terminals 2. The control section 44 controls the communication management section 43 so as to store information regarding the communications in accordance with the E-mail received at the communication section 41. The instruction information preparation section 45 prepares instruction information for the S information terminals 2 in accordance with the instructions received from the control section 44 with reference to the communication management section 43. Moreover, the information control apparatus 4 is provided with a memory 46 and an input section 47. The memory 46 is used as an operation region when the control section 44 is in operation. The input section 47 receives instructions from a user of the information management apparatus 4. This enables the information management apparatus 4 to instruct the S information terminals 2 in a manner that results in the provision of appropriate service to the digital composite machine 1, in accordance with the operational information from the digital composite machine 1.

The management system of the present embodiment includes a plurality of the digital composite machines 1 disposed in plural zones. The digital composite machines 1 are installed at the user's (customer's) location as a result of a purchase or lease arrangement. In this respect it should be noted that, in FIGS. 1 and 2, for convenience of the explanation, only one digital composite machine 1 is shown, but in actual use plural users each respectively having the digital composite 1 that is connected to the network 3 are contemplated.

On the other hand, the information management apparatus 4 and the plural S information terminals 2 are associated with a service department that is responsible for the maintenance and other service of the digital composite machines 1, for example in FIG. 2, a service center 200, as the primary receiving end. The information management apparatus 4 is installed at the service center 200, while the S information terminals 2 constitute various information terminals (such as a notebook computer, or a portable information terminal) that are respectively carried by the individual service personnel.

In the present invention, the control section 12 controls the E-mail communication section 11 such that service results are transmitted to the information management apparatus 4. This occurs upon the preparation of the service results that constitute the operational information associated with the image forming section 20 when image forming operations are resumed after the digital composite machine 1 has been serviced (supported or maintained).

In this way, operational information that indicates the operational condition of the digital composite machine 1 is transmitted to the information management apparatus 4 by E-mail after digital composite machine 1 has received service. Accordingly, for example, whether or not the image forming operation of the digital composite machine 1 is operated in an appropriate operational condition level, whether or not the digital composite machine 1 operates in an appropriate condition, and/or whether or not the digital composite machine 1 operates correctly (satisfactorily) after the digital composite machine 1 has been operated for a predetermined period after receiving service are determined and transmitted to the information management apparatus 4 via E-mail.

The information management apparatus 4 is installed in the service center 200 (the manager) for managing the digital composite machines 1. Therefore, it is possible for the service center 200 to surely check whether or not a particular provided service has fully restored the functions of the digital composite machine 1, or whether or not the result of the service is otherwise appropriate. In addition, in those cases wherein there is still trouble adversely impacting upon the operation of the previously serviced digital composite machine 1, the location of the information management apparatus 4 in the service center 200 allows appropriate service personnel to respond quickly to the trouble, thereby improving the serviceability of the various digital composite machines in the system.

In this regard it should be further noted that, in the present invention, the term "service" is intended to encompass maintenance, a repair, a check, a renewal of consumable goods and a renewal (replacement or addition) of parts for the digital composite machine 1 (electronic apparatus). Thus, in the present invention, "service" is deemed to include: a repair of an electronic apparatus that has broken down, a check carried out regularly even if no trouble has occurred, and a renewal of the consumable goods, such as the toner, and the renewal (replacement of) parts. Therefore, it will be understood that a renewal may be renewal of a unit so as to expand the functions of the electronic apparatus, or renewal (replacement) of a present part of the electronic apparatus or unit attached to or otherwise associated with the electronic apparatus. Further, service is herein deemed to include the expansion of the functions of the electronic apparatus by an addition of a unit. Of course, other types of operations performed on or in association with the electronic apparatus may be included within the meaning of "service" as used herein, depending on a type of the electronic apparatus involved in any particular usage context within the preview of the present invention.

Next, a management system and a management method for the digital composite machine 1 of the present embodiment will be explained.

As shown in FIG. 2, when the digital composite machine 1 experiences trouble, or it is time for the performance of maintenance on the digital composite machine 1 (maintenance time), first, the digital composite machine 1 sends a service request (for example, a request for a repair or a request for a check) to the service center 200. The service request may be made via E-mail by the E-mail communication section 11 provided in the digital composite machine 1, or by a user via telephone, or facsimile.

After the receipt of the service request, the service center 200 transmits service instructions via E-mail to an S information terminal 2 that is carried by a service personnel who is in charge of the digital composite machine 1. These E-mail service instructions instruct the service personnel to perform service on or in connection with the digital composite machine 1 that sent the service request.

In the example shown in FIG. 2, the service personnel are on the road, driving a service car (an automobile for service) in his sales area. The service personnel visits the user's location by way of the service car and provides various services on or in association with the digital composite machine 1 that requested those services (i.e., a repair, a check a renewal of the consumptive goods, or the like as discussed above). In FIG. 2, for convenience of explanation, the service car is identified by the reference numeral 2, which is the same reference numeral used in connection with the S information terminal 2.

After the requested service has been performed, the display panel 21b of the operation panel 21 displays a question concerning the result of the service so that the user can indicate whether or not a specific function of the digital imaging apparatus (here, the image forming operation) is adequate (i.e., appropriate, satisfactory or in order).

The user operates the operation panel 21 so as to input operational condition information indicative of whether or not the image forming operation is adequate. As a result, a support result is prepared as the operational information concerning the image forming operation. The control section 12 controls the E-mail communication section 11 so as to cause the information management apparatus 4 to transmit the service result. In this manner, the service center 200 is notified of the service result input by the user.

The service center 200 decides how to next proceed in accordance with the content of the service result. In other words, if the service result indicates that the image forming operation is adequate (appropriate, satisfactory, or in order), it is judged that the user is satisfied with the service provided by the service personnel, and the information management apparatus 4 proceeds to charge the user for the cost of the service (accounting).

On the other hand, if the service result indicates that the image forming operation is remains inadequate (inappropriate, or out of order), it is determined that the user is not satisfied with the service result. In such a case, the information management apparatus 4 selects the service personnel in charge of the electronic apparatus unsatisfactorily serviced, or another service personnel in some cases, and transmits instructions for the performance of the service again via E-mail to the S information terminal 2 of the selected service personnel. Then, the service personnel visits the user's location again to perform the service on or in association with the digital composite machine 1 again (the second visit is not shown here).

It is to be understood that there are some cases in which no service personnel needs to be dispatched to the user's location. For example, the trouble event experienced by the digital composite machine 1 may have been solved but minor adjustments may still be required. In such cases, it is possible to make the minor adjustments by a remote operation from the service center 200 via the network 3, or by giving advice and/or instructions concerning the same to the user by telephone, facsimile or the like.

Further, the display contents displayed on the display panel 21*b* of the operation panel 21 is not limited to a specific arrangement. For example, an alternative question may be displayed by means of the soft keys (touch keys) concerning whether or not the image forming operation is adequate or inadequate. This makes it easier for the user to select an answer indicating whether or not the operational condition of the image forming operation is adequate or inadequate.

Specifically, as shown in FIG. 2 for example, a message such as "How is the operation after the service?" is displayed on the display panel 21*b* of the operation panel 21 of the digital composite machine 1 that has been serviced along with soft keys respectively labeled "Good" and "Bad". The user answers (inputs) whether or not the image forming operation is adequate (good) or inadequate (Bad), by means of the touch panel functions of the display panel 21*b*.

More particularly, the user presses (operates) the soft key for "Good" if the user judges that the digital composite machine 1 works adequately and without a trouble. On the other hand, if the user judges that the operation of the digital composite machine 1 is inadequate, the user presses (operates) the soft key for "Bad". In accordance with which soft key is pressed (the operation of the soft keys), the operation information is prepared indicating whether the image forming operation is good (adequate) or bad (inadequate).

Furthermore, it is preferable in the present invention that the operation panel 21 displays the display for inputting a service result in accordance with the operational condition of the image forming operation that has been carried out until a preset specific condition has been satisfied.

For example, immediately after the completion of a service event, it often is difficult for a user to clearly judge whether or not the digital composite machine 1 is operating adequately and without trouble. Therefore, a preset specific condition may be established in advance so that the determination of the adequacy of the image forming operation is not required until the preset specific condition has been satisfied. This makes it possible to prepare operational information (a service result) that more precisely indicates the operational condition of the apparatus and provides a more satisfactory service result to the user.

The preset specific condition is not limited to any particular condition. However, in the present embodiment as an example, a predetermined number of times that the digital composite machine 1 is used to form an image after the performance of the service has been completed, establishes the time at which the user is requested to indicate whether or nor he deems the operation of the apparatus to be adequate.

As shown in FIG. 1, the digital composite machine 1 is provided with the counter 16 for the purpose of counting how many times the image forming section 20 carries out the image forming operation (see the arrow pointing at the image forming section 20 from a position of the counter 16). Thus, the control section 12 sets a specific number of times that the image forming operation is to be carried out in advance as the standard delay interval following the completion of a service event for the display of an indication requesting information concerning the user's satisfaction with the particular service event, and controls the counter 16 such that it counts the number of times that the image forming operation is carried out since a resumption of image forming operations following the completion of a service event, such that the message depicted in FIG. 2 is displayed on the display panel 21*b*, when the counting result reaches the specific number of times.

More specifically, the counter 16 counts each time that the image forming operation is carried out as 1 job. The preset specific number of times is represented as N jobs (a specific numerical value, such as N=100). Then, the control section 12 judges whether or not the counting result (x jobs), which is obtained by the counter 16 counting the image forming operations has reached the preset specific number of jobs (i.e., whether or not x=N).

At the time when the counter 16 reaches the counting result x=N jobs, the display panel 21*b* of the operation panel 21 displays a message requesting the user to indicate whether or not the operational condition of the image forming operation is adequate. In this manner, it is possible to prepare operational information (a service result) that more precisely indicates the user's evaluation of the operational condition of the image-forming device subsequent to the performance of service thereon.

In this regard it is preferable that the specific numerical value be changeable by an adjustment of the operation of the operation panel 21, for example. This is because the frequency of use of the digital composite machine 1, it is not necessarily constant in all situations. Therefore, it is necessary to alter the preset numerical value according to how the user uses the digital composite machine 1. This flexibility makes it possible to prepare the operational information more surely, and to more promptly respond to trouble events experienced by the image forming apparatus or the like.

Thus, the present embodiment of this invention requires the user to confirm whether or not the digital composite machine 1 has been restored to satisfactory operation by the performance of the service. Therefore, it is possible for service personal to promptly respond to a trouble condition notification after an original performance of the service, thereby improving the serviceability of the apparatus. Moreover, because the cost of the service is charged only if it is determined that the digital composite machine 1 has been appropriately and satisfactorily serviced, the cost of the service is charged in a manner that is clearly correct from the points of view of both the manager and the user.

Also, in the present embodiment of this invention, the information management apparatus 4 is set as the primary receiving end, and the S information terminals 2 are set as the secondary receiving end. This results in the information management apparatus 4 functioning as a gateway for receiving the operational information from the digital composite machine 1 for transmission of service instructions to the S information terminals 2 via E-mail. However, it is to be understood that the present invention is not limited to the this arrangement.

For example, if a single S information terminal 2 is provided rather than the plurality of the single S information terminals 2 mentioned above, the digital composite machine 1 may transmit the service request or the service result directly to the S information terminal 2 via E-mail, without the need for it to pass through the information management apparatus 4. In otherwords, the management system of the present invention does not necessarily have to include the information management apparatus 4.

Moreover, the management system of the present invention also may be so arranged that the digital composite machine 1 directly sends E-mail to the S information terminal 2 even though the information management apparatus 4 is included in the arrangement. For example, the S information terminal 2 may be the receiving end for the service result judged by the user.

However, even if the service result is directly transmitted to the S information terminal 2, it is preferable that service is managed by the service center 200 (that is the information management apparatus 4). Therefore, for example, the management system may be arranged such that the digital composite machine 1 transmits the service result to the S information terminal 2 and the information management apparatus 4 at the same time, or such that the service result is forwarded to the information management apparatus 4 from the S information terminal 2 after it has received the service result.

Second Embodiment

A second embodiment of the present invention now will be discussed with reference to FIGS. 3 to 5. For convenience of explanation, sections of the second embodiment having identical functions to corresponding sections already discussed with reference to the first embodiment are identified by the same reference numerals and a full explanation of those sections is omitted in the following discussion.

While the first embodiment employs the operation panel 21 as the operational information preparation means such that the user can operate the operation panel 21 to confirm the satisfactory nature of the service result (the operational condition) after performance of the service, the present embodiment includes an arrangement in which a self-diagnosis section (self-diagnosis means) 13 functions as the operational information preparation means (the operational condition checking section and the operational information preparation section), instead of the operation panel 21. The self-diagnosis section 13 diagnoses the operational condition of a digital composite machine 1, and prepares a result of the self-diagnosis as operational information.

Figure 3:
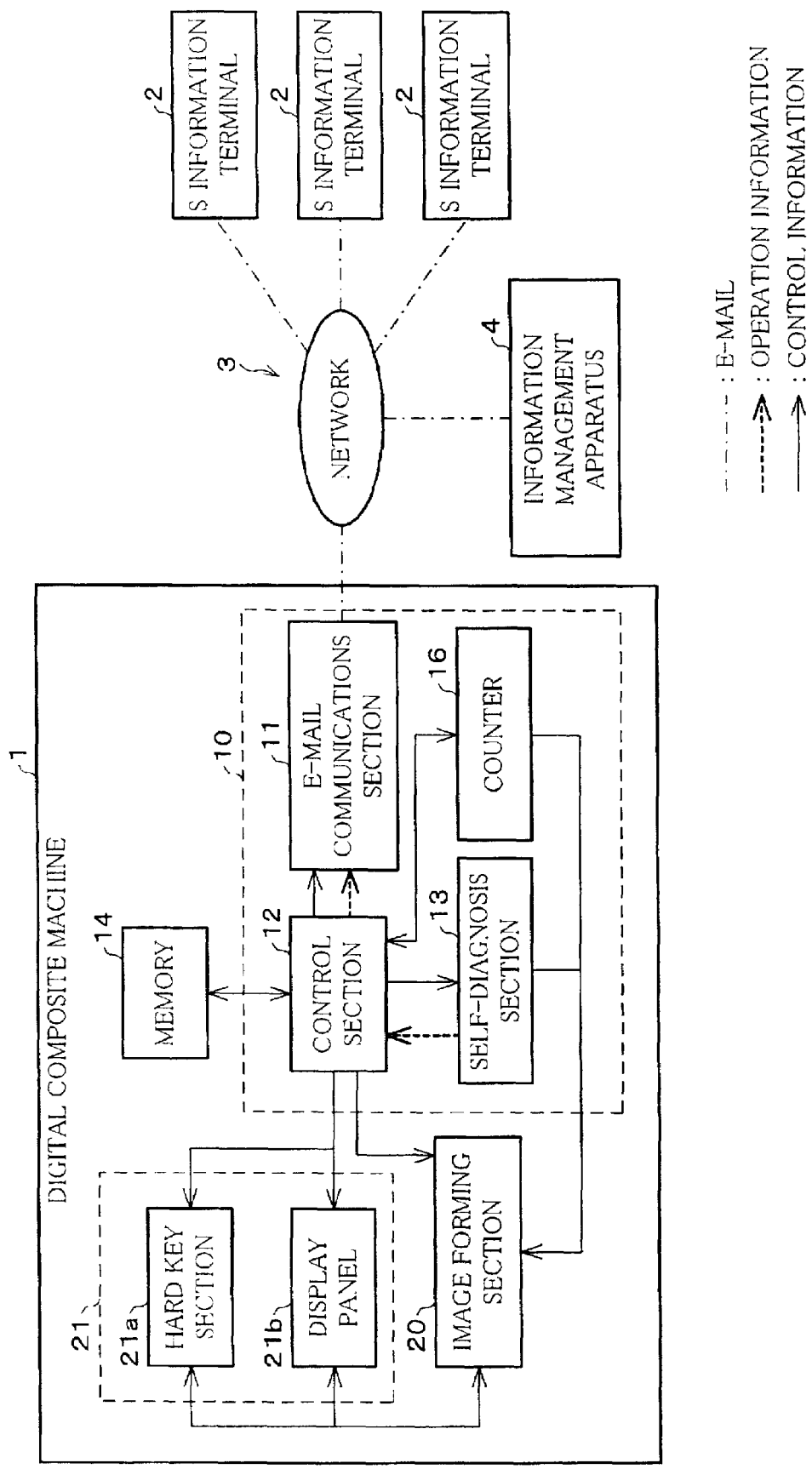
FIG. 3 is a block diagram showing an example where a management system of an electronic apparatus of a second embodiment of the present invention is employed for managing a digital composite machine.

In other words, a management system of the present embodiment, shown in FIG. 3, has an arrangement that is basically identical with the arrangement shown in FIG. 1 for the first embodiment, but in addition includes self-diagnosis section 13 in information communication section 10. The operational information is not outputted from an operation panel 21 in the present embodiment, as indicated by absence of the bold dotted line arrow extending from the operation panel 21 to the control section 12, as in FIG. 1. However, the other parts of the arrangement constituting the present embodiment are identical to those of the first embodiment.

The self-diagnosis section 13 diagnoses at least the condition of image forming section 20 so as to prepare the self-diagnosis result, while a control section 12 controls the self-diagnosis section 13 to prepare a self-diagnosis result (the operational information) after the performance of a service event, and the self-diagnosis result is transmitted via E-mail to an information management apparatus 4 as a primary receiving end. Of course, the control section 12 controls the whole operation of digital composite machine 1, as in the first embodiment.

Figure 4:
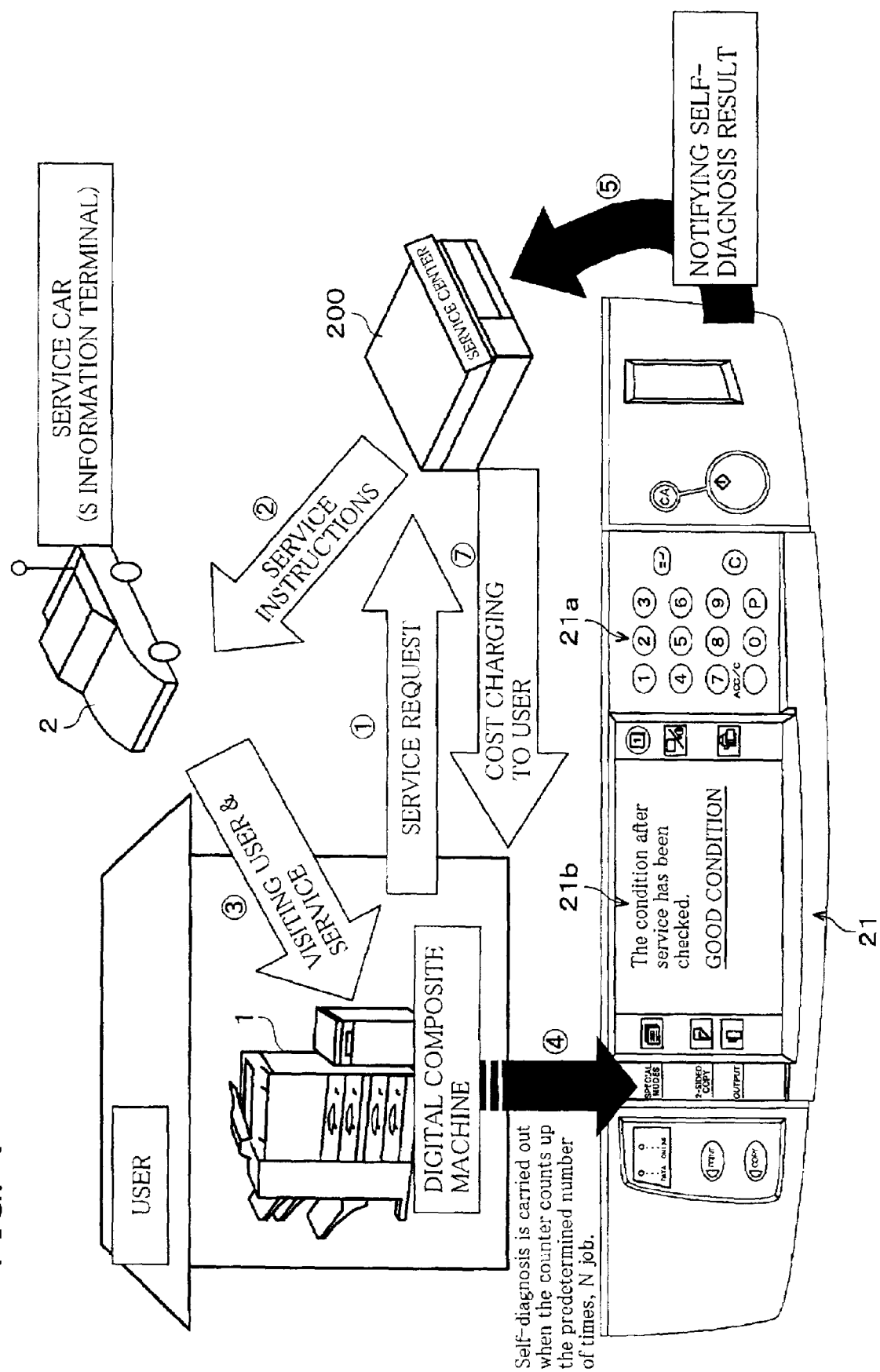
FIG. 4 is an explanatory view illustrating how operational information indicative of improper service is prepared and transmitted and how service is provided to a user in the management system shown in FIG. 3.
Figure 5:
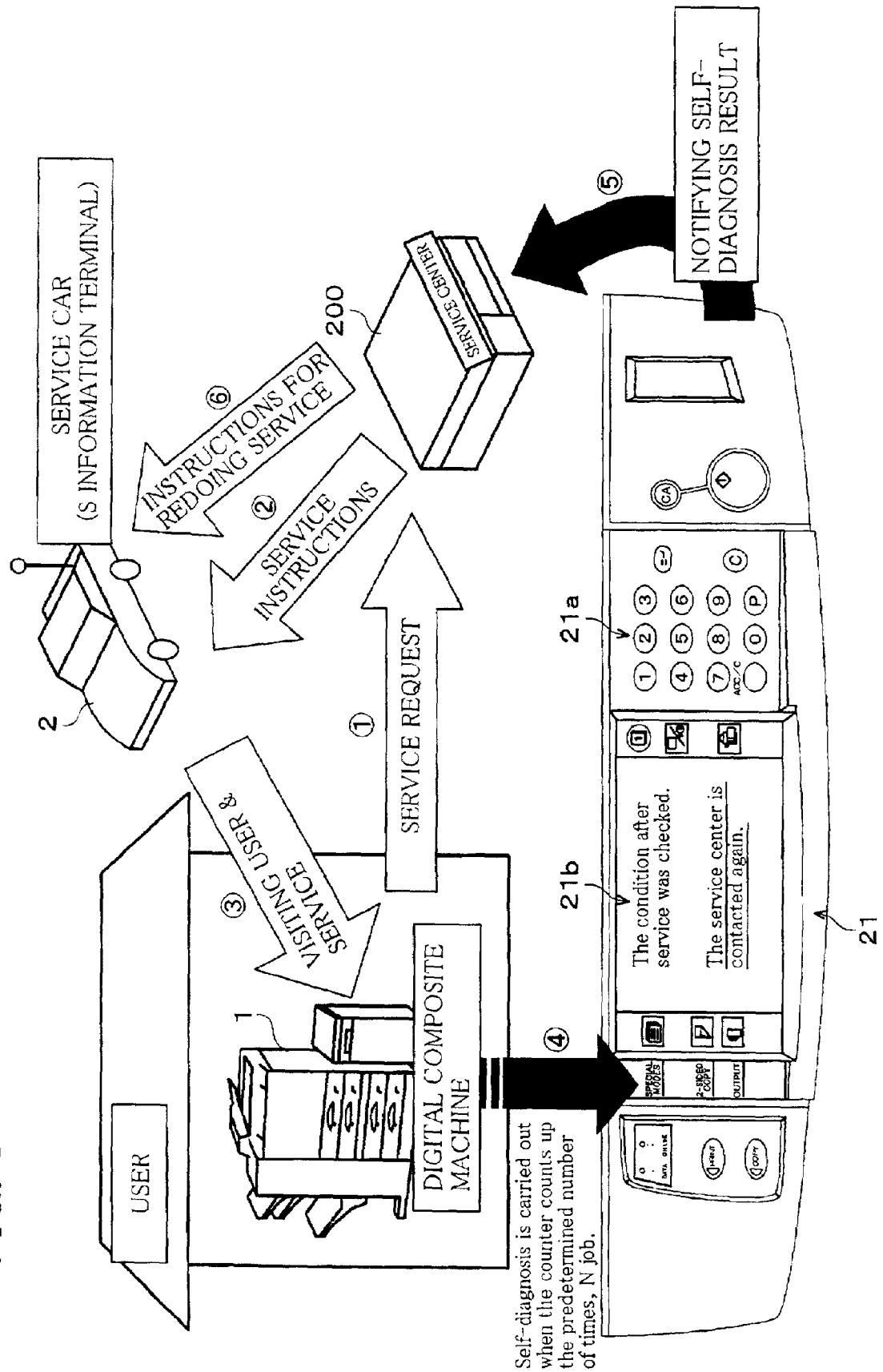
FIG. 5 is an explanatory view illustrating how operational information indicative of improper service is prepared and transmitted and how service is provided to a user in the management system shown in FIG. 3.

An explanation of the management system and management method for the digital composite machine 1 of the present embodiment follows:

As shown in FIG. 4, if the digital composite machine 1 encounters trouble, or a scheduled time for maintenance of the digital composite machine 1 has arrived, steps similar to those explained above with regard to the first embodiment are carried out. Thus, the digital composite machine 1 sends a service request to a service center 200. Then, the service center 200 transmits service instructions via E-mail to one of the S information terminals 2 carried by the respective service personnel. The service personnel visits the location of the user of the digital composite machine 1 via a service car and performs the various requested services on or in association with the digital composite machine 1. The procedure of this second embodiment is identical with that of the first embodiment to this point.

In the present embodiment, however, the control section 12 controls the self-diagnosis section 13 so as to diagnose the operational condition of the digital composite machine 1. Then, the self-diagnosis section 13 checks whether or not the image forming operation is being carried out normally, so as to ascertain whether or not the previously requested service was adequate. Thereafter, this self-diagnosis result is displayed on a display panel 21b of the operation panel 21, and the service center 200 is notified of the self-diagnosis result via E-mail.

The service center 200 selects the next step in accordance with the self-diagnosis result. Hence, if the self-diagnosis result is that the previously requested service was satisfactory, it is judged that the user is satisfied with the service. Therefore, the information management apparatus 4 of the service center 200 charges the user the cost of the performed service.

On the other hand, if the self-diagnosis result is that the previously requested service is unsatisfactory, it indicates that the previously requested service was inadequate and the user is not satisfied with the service, and the service personnel is instructed via E-mail, to perform the service again (service redoing instructions). Thus, the service personnel visits the user's location again to perform the requested service.

The display message displayed on the display panel 21b of the operation panel 21 is not limited to any particular phraseology, provided that the self-diagnosis result can be generally understood therefrom by the user.

For example, if the self-diagnosis result given by the self-diagnosis section 13 is "Good", the display panel 21b displays the message "the condition after service was checked. "GOOD CONDITION", as shown in FIG. 4. Thereafter, E-mail communication section 11 transmits the self-diagnosis result of "Good" (the condition is adequate) to the service center 200. Then, the service center 200 charges the user the cost of the performed service.

On the other hand, if the self-diagnosis result is "Bad", the display panel 21b displays a message "The condition after service was checked. BAD CONDITION". The service center then is contacted again, as shown in FIG. 5 and the E-mail communication section 11 transmits the self-diagnosis result of "Bad" (the condition is inadequate) to the service center 200, whereupon the service center 200 instructs the service personnel to perform the service again.

As in the first embodiment, it is preferable in the present embodiment that a message requesting the input of a service result in accordance with the operational condition of the image forming operation that has been carried out be delayed until a predetermined specific condition has been satisfied. In other words, it is preferable that the self-diagnosis section 13 transmits its diagnosis of the operational condition of the apparatus only after a specific predetermined condition has been satisfied subsequent to the completion of the performance of the service.

The specific predetermined condition is not limited, however, as was the case in the first embodiment, a preferred example of a predetermined condition is a number of times that the digital composite machine 1 has been used subsequent to the completion of the performance of the service,— that is, how many times the image forming operation has been carried out after the provision of the service was completed. More specifically, as shown in FIG. 3, a counter 16 is provided for counting how many times the image forming operation is carried out (x jobs). That number (x jobs) is compared with the number (N jobs) representing the predetermined condition (i.e., number of image forming operations carried out following the completion of the provision of the service) so that the self-diagnosis section 13 diagnoses provides the operational condition information when the counted number equals the predetermined number (i.e., x jobs=N jobs).

As a specific example of the second embodiment of the present invention, consider the case where the digital composite machine 1 is provided with plural paper trays for feeding sheets of a recording medium to an image forming apparatus, and assume that a second paper tray from the top encounters a paper jam condition when a sheet is fed to the image forming apparatus therefrom. Also assume that the paper jam has been solved (serviced, repaired) once by service personnel who has provided various services to solve the causes of the original paper jam, possibly among other trouble conditions.

After the completion of the provision of the service, the self-diagnosis section 13 determines the number of times that a sheet of recording media is fed from the second paper tray within the period of time required for the counting of x jobs by the counter 16 to reach the predetermined N job standard (here a job corresponds to the feeding of a sheet by the second tray rather than an image forming operation). If no paper jam is occurs prior to the counted x jobs reaching the predetermined N job standard, the display panel 21b displays the message "The condition after service was checked. GOOD CONDITION", as shown in FIG. 4.

On the other hand, if paper jam is caused before the N job standard is reached, the display panel 21b displays the message "The condition after service was checked. BAD CONDITION", and the service department are contacted again, as shown in FIG. 5. Further, the service center 200 is notified of the self-diagnosis result so that the service center 200 can determine how to proceed in accordance with the self-diagnosis result, as discussed above.

Accordingly, in those cases wherein the self-diagnosis section 13 is provided so as to make all the above-described judgments automatically, as in the present embodiment, the control section 12 may be so arranged that the control section 12 temporarily stops the operation of a section of an electronic apparatus that causes the improper operational condition.

For example, if the self-diagnosis section 13 prepares operational information that indicates the operational condition of the digital composite machine 1 is inadequate (the second paper tray has the paper jam), the control section 12 stops the operation of the second paper tray temporarily, while it controls the E-mail communication section 11 so as to cause the transmission of the operational information to the service center 200.

If the operation condition of the second paper tray remains inadequate after the service is performed, it is necessary to repeat the service. Therefore, it is possible to suppress not only the specific trouble event noted (i.e., the paper jam) but also other problems (troubles) that may be consequently caused thereby, by stopping the operation of the second paper tray during the transmission of the operational information to the service center 200. The problems, which are consequently caused by the paper jam include, for example, the trouble associated with the paper jam at the second paper tray becomes more severe, or the trouble (paper jam) of the second paper tray adversely affects other sections of the image forming apparatus.

In this way, the present embodiment causes the self-diagnosis section 13 to determine (diagnose) whether or not a previously performed service has restored the digital composite machine 1 to a condition in which it functions satisfactorily. This makes it possible for service personal/managers to promptly respond to unsolved trouble conditions or newly caused trouble conditions subsequent to an original provision of service, thereby improving the serviceability of the electronic apparatus.

Moreover, because the cost of the service is charged only if adequate service is provided, it is possible to charge the cost of the satisfactory service to the user in a manner that is clear to both the manager and the user.

Third Embodiment

A third embodiment of the present invention now will be described, with reference to FIG. 6. As was the case with respect to the second embodiment, the present invention is not to be considered as being limited to this third embodiment and sections identical with those used in either of the first or the second embodiments are indicated by the same reference numerals and a detailed explanation of those common sections is omitted.

Differently from the first and the second embodiments wherein the service center 200 is notified of the operational information by E-mail irrespective of the nature of the of the user's or the self-diagnosis service result (whether or not the service is adequate or inadequate), the present embodiment provides an arrangement in which a control section 12 controls an E-mail communication section 11 to transmit the operational information to a service center 200 only when operational information is prepared to inform a service center that the operational condition of the digital composite machine 1 is inadequate.

For example, two types of contracts for the servicing of digital composite machines 1 may be offered: a full service contract having a fixed rate cost that includes all services at the fixed rate, or a spot service contract having a variable rate cost that provides service only when it is necessary and charges the cost of each service each time it is satisfactorily performed. The first and the second embodiments discussed above are examples of spot service contracts because a cost is charged for each trouble event/condition that receives service. However, the full service contract alternative does not charge for each trouble event/condition serviced. In other words, steps of charging the user for each satisfactory service performed and of notifying the service center concerning each satisfactory service result are unnecessary in the full service contract context.

Figure 6:
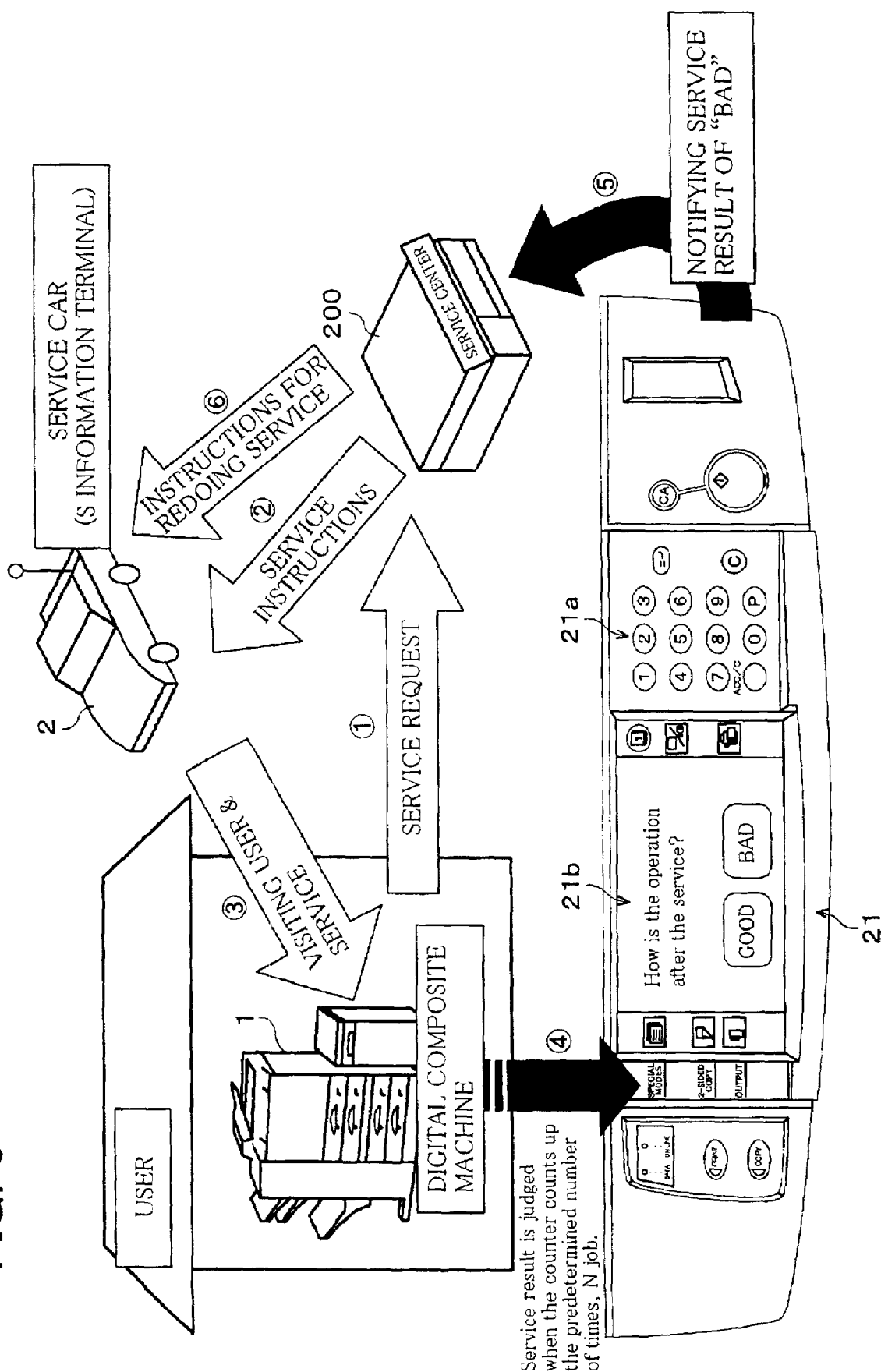
FIG. 6 is an explanatory view illustrating how operational information indicative of improper service is prepared and transmitted, and how service is provided to a user in the management system for an electronic apparatus of a third embodiment of the present invention.

More specifically, when a trouble condition or event occurs, as shown in FIG. 6, the service center 200 transmits service instructions via E-mail to one of the S information terminals 2 carried by the respective service personnel; the service personnel visits the location of the user of the digital composite machine 1 via a service car and performs the various requested services on or in association with the digital composite machine 1 as in the first and the second embodiments.

Thereafter, for example as shown in FIG. 6, operational information is prepared in a manner identical with that of the first embodiment shown in FIG. 2. The message "How is the operation after the service?" and the soft keys "Good" and "Bad" are displayed on a display panel 21*b* of an operation panel 21 of a digital composite machine 1 that has been serviced, and the user judges the result of the service. Alternatively, the operational information is prepared by determining (diagnosing) the result of the service automatically by the self-diagnosis section 13 as shown in FIGS. 4 and 5 of the second embodiment.

If the prepared operational information indicates that the operation condition is inadequate, for example as shown in FIG. 6, a soft key indicating "Bad" is pressed (refer to the first embodiment), or the self-diagnosis result determines that a trouble condition/event has not been corrected by the service (the second embodiment), and the service center 200 is notified of the operational information via E-mail. The preparation of the operational information when the service result is satisfactory is not carried out in this embodiment.

Since the service center 200 receives via E-mail only the operational information indicating that the operational condition is inadequate (the service result is "Bad") as shown in FIG. 6, an information management apparatus 4 of the service center 200 instructs a service personnel to repeat the service and the step of charging the user for the services not carried out contrary to the first and the second embodiments.

As discussed above, no additional service is necessary when the operation of the electronic apparatus is adequate, while additional service is needed if the operation of the electronic apparatus is inadequate. Thus, the service center 200 is notified of the condition of the digital composite machine 1 (electronic apparatus) only when additional service is necessary, (i.e., the operation condition is inadequate) in this embodiment. This makes it possible to respond promptly to a trouble condition or event at the electronic apparatus, thereby further improving its serviceability.

Fourth Embodiment

A fourth embodiment of the present invention is explained below with reference to FIGS. 7 and 8(*b*). As with the other embodiments, the present invention is not limited to the present embodiment. Also, for convenience of explanation, sections identical with those used in any of the first, second or third embodiments are indicated by the same reference numerals as used for those sections above, and a further explanation of them is omitted.

The present embodiment is characterized by the arrangement in which the first and second embodiments are combined, that is, plural pieces of operational information are prepared.

Figure 7:
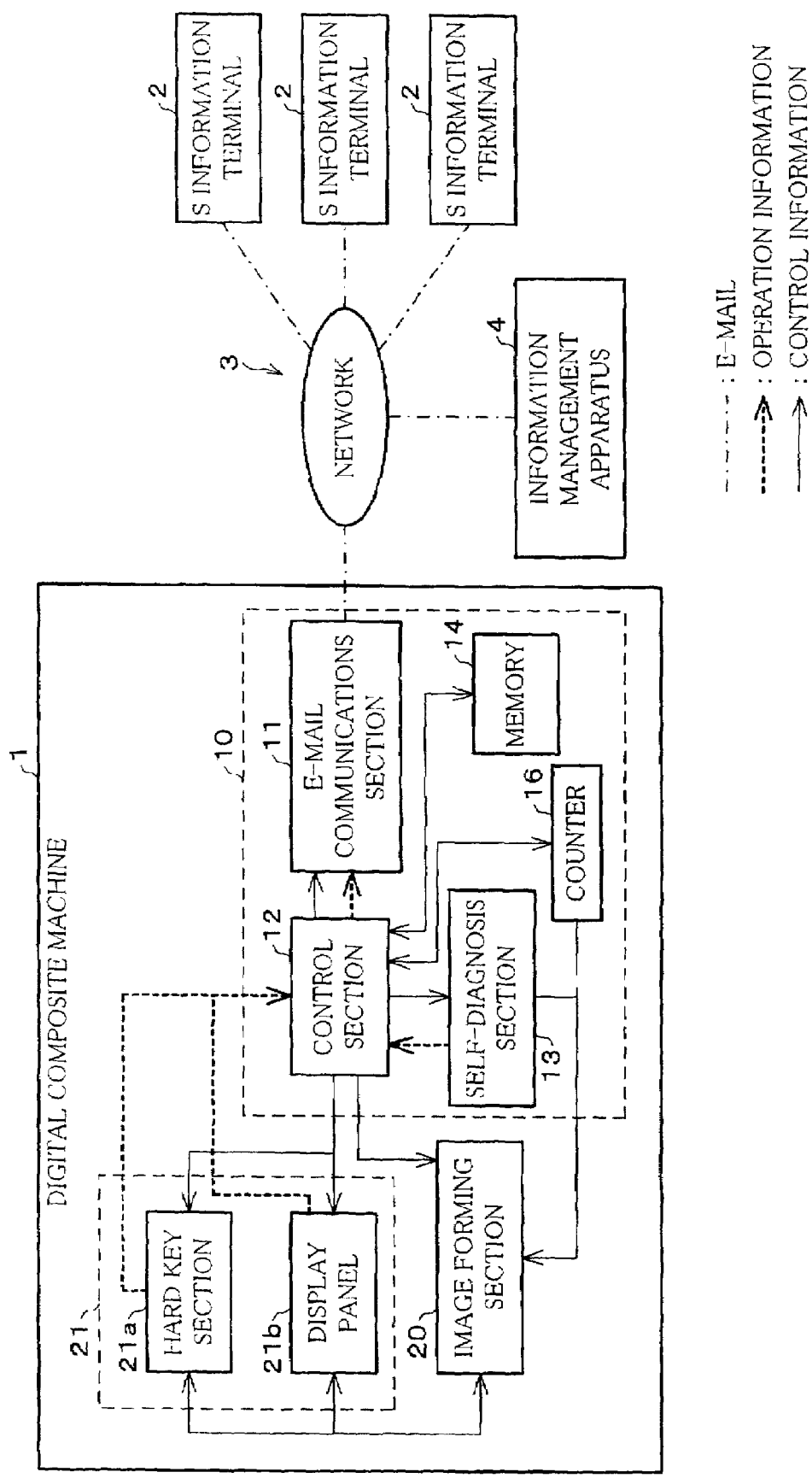
FIG. 7 is a block diagram showing an example where a management system for an electronic apparatus of a fourth embodiment of the present invention is employed for managing a digital composite machine.

As shown in FIG. 7, a management system of this embodiment includes an arrangement that is basically identical with that of the second embodiment shown in FIG. 3, but wherein the operational information is outputted to a control section 12 not only from self-diagnosis section 13, but also from operation panel 21 (see bold dotted-lined arrow in FIG. 7). The other parts of the arrangement of this embodiment are identical with the arrangements of the first and second embodiments and are not further explained here.

The management system and management method for the digital composite machine 1 of the present embodiment include the same initial steps as the first to third embodiments. Specifically, the digital composite machine 1 sends a service request to a service center 200. Then, the service center 200 transmits service instructions via E-mail to one of the S information terminals 2 carried by the respective service personnel. The service personnel visits the location of the user of the digital composite machine 1 via a service car and performs the various requested services on or in association with the digital composite machine 1.

Thereafter, the operational information is prepared by the self-diagnosis means and the user's judgment of the service result. For example, as shown in FIG. 8(*a*), a display panel 21*b* of the operation panel 21 of the digital composite machine 1, which has been serviced, displays the massage "Self-diagnosis checked the condition after the service. GOOD CONDITION", thereby indicating the self-diagnosis result, as in the second embodiment. Then, as shown in FIG. 8(*b*), the message "How is the operation after the service?" and soft keys "Good" and "Bad" are displayed on the display panel 21*b* for the input of the user's judgment of the adequacy of the service.

In other words, if the user determines that the operation of the electronic apparatus subsequent to the performance of the service is inadequate while the self-diagnosis result is good, further service is required. Therefore, when the user presses the soft key of "Bad" so as to initiate the preparation of a service result indicating that the operation condition is inadequate, the user's judgment is accorded priority. Therefore, the service center 200 is notified of the "Bad" operational information via E-mail.

Consequently, the service center 200 can more appropriately determine the next step because both the service results prepared by the user's judgment and the self-diagnosis result are used as operational information. Therefore, in the above example, the self-diagnosis is carried out first, followed by the user determination of the service result, however, the inverse order of these steps is also contemplated within the broadest scope of this embodiment. Hence, the soft keys as shown in FIG. 8(*b*) may be displayed first, followed by the self-diagnosis result as shown in FIG. 8(*a*).

In this case, it is preferable that a user's determination judgment) of a "Bad" service result is surely given priority and the user's judgment is transmitted to the service center 200 as the operational information. On the other hand, however, when the user determines (judges) that the service result is "Good", the self-diagnosis still may find a trouble condition or event. In this case, it is preferable that the self-diagnosis result take priority and be transmitted to the service center 200 as the operational information.

This fourth embodiment of the present invention is so arranged that, when the user judges the image forming operation is inadequate following a performance of service, the user's judgment is surely given priority. However, the self-diagnosis result takes priority if the self-diagnosis result indicates that the operation of the electronic apparatus following a performance of service is inadequate even if the user has determined that the image forming operation of the electronic apparatus is adequate. The above arrangement concerning the priorities of operational information generated by different sources further improves the reliability of the service, since a worst case is always selected thereby resulting in a repeat of the service, which ensures its adequacy.

Fifth Embodiment

A fifth embodiment of the present invention now will be described with reference to FIGS. 9 and 10. Again, the present invention is not limited to this embodiment, and for convenience of explanation, sections identical with those used in any of the first to fourth embodiments are identified by the same reference numerals, and a full explanation of those sections is omitted here.

In the first through fourth embodiments, counter 16 is used to count the number of times that the image forming operation is performed after the completion of a servicing of the image forming apparatus for comparison with the predetermined specific condition (N jobs) used as a reference to determine when to prepare the operational information. The present embodiment, however, uses a time obtained from a timer as the condition to be matched with a predetermined condition to determine when the operational information is to be prepared.

Figure 9:
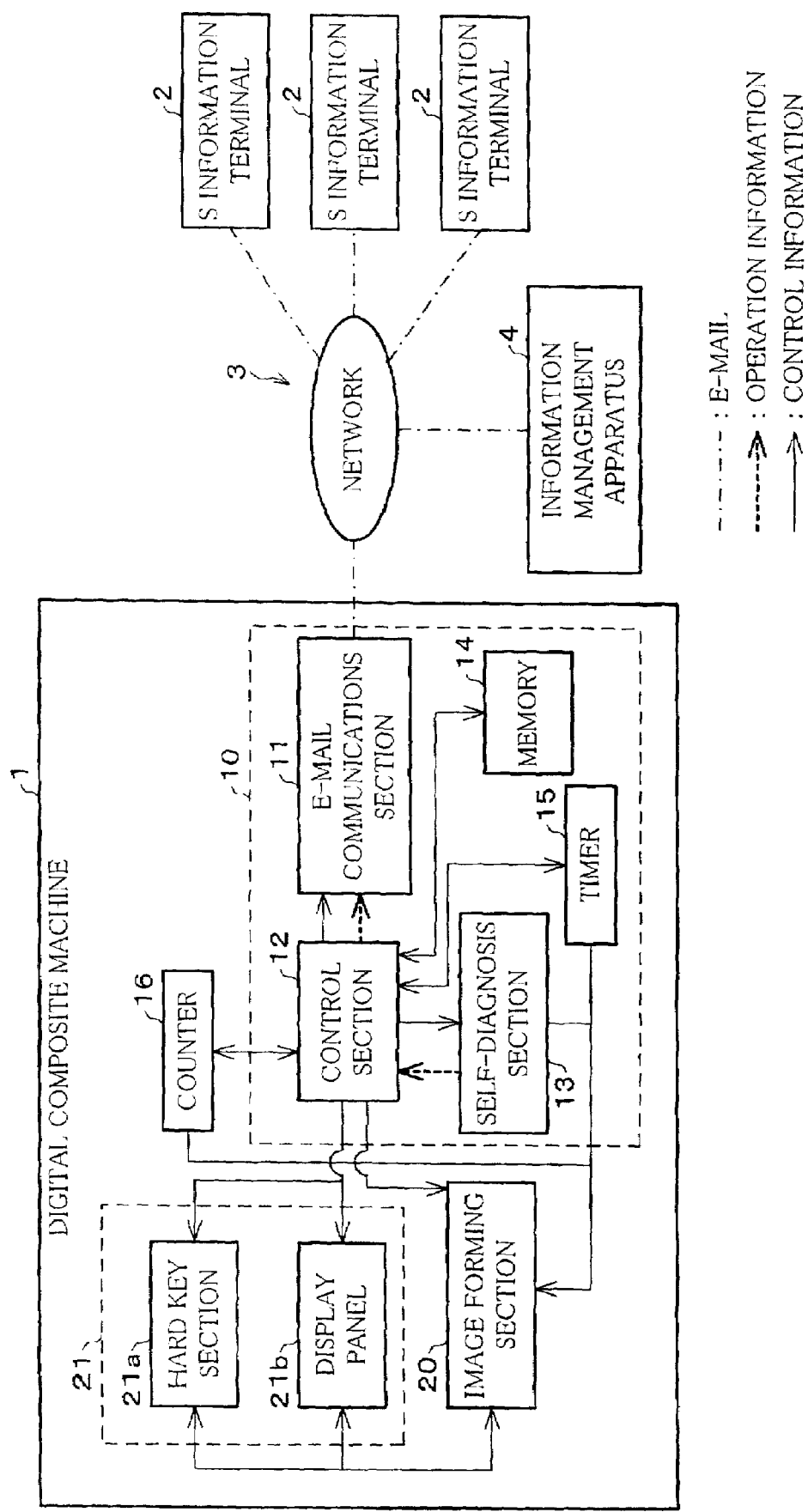
FIG. 9 is a block diagram illustrating a management system of an electronic apparatus of a fifth embodiment of the present invention employed for managing a digital composite machine.
Figure 10:
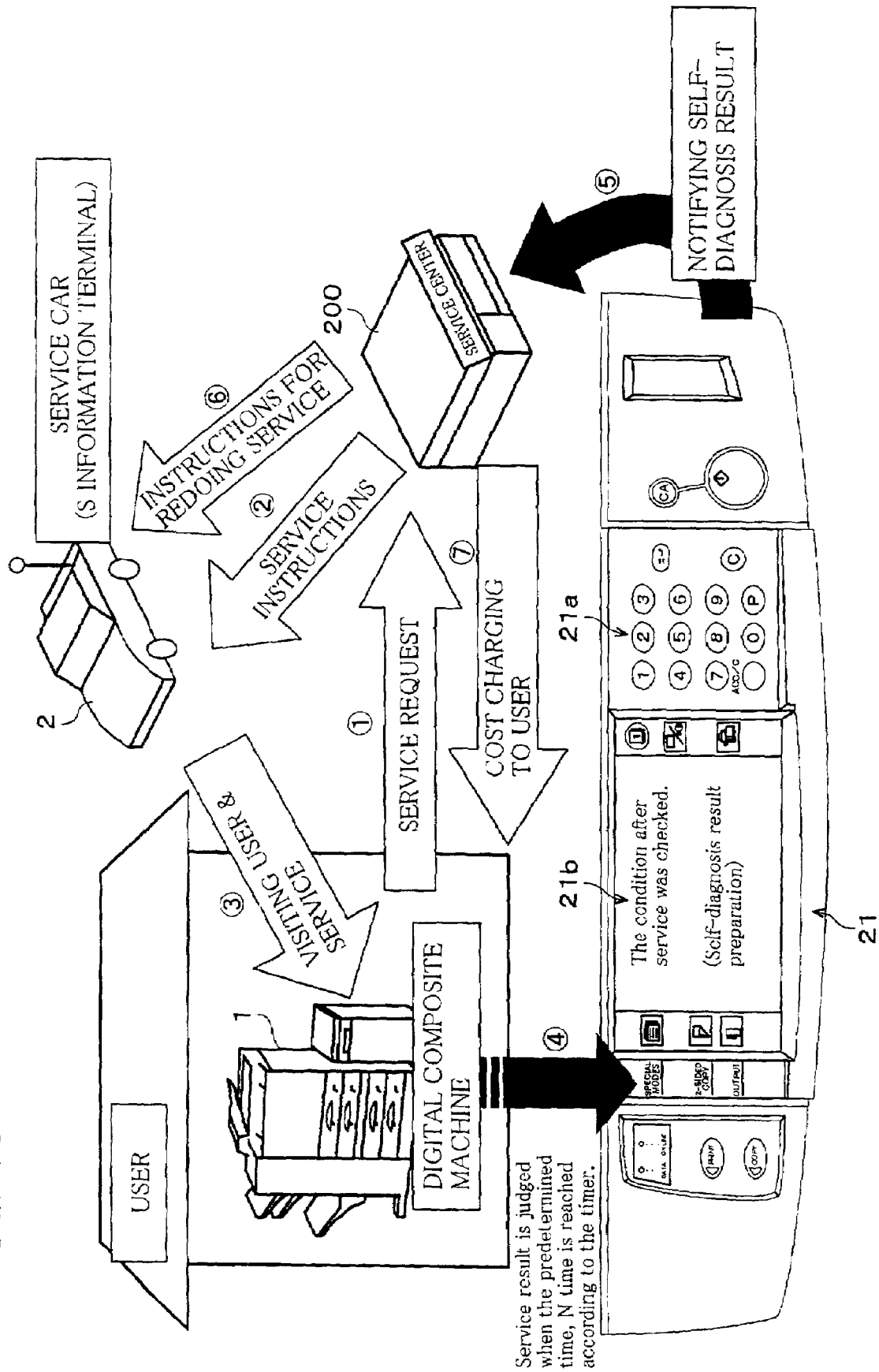
FIG. 10 is an explanatory view illustrating how operational information is prepared and transmitted, and how service is provided to a user in the management system shown in FIG. 9.

A management system of the present embodiment, as shown in FIG. 9 is basically identical with that of the second embodiment shown in FIG. 3, except that an information communication section 10 is provided with a timer (timing means) 15, as well as the counter 16. Since the other parts of the arrangement are identical with those of the first and the second embodiments, further detailed explanation of those parts is omitted here.

The timer 15 is for measuring time. Notification of the service result, which is controlled by control section 12, is carried out based on a time measured by the timer 15. In the present embodiment, the information communications section 10 is provided with a self-diagnosis section 13 and the control section 12 refers to the time measured by the timer 15, and based upon that measurement determines when the self-diagnosis section 13 should carry out the self-diagnosis and generation of the associated operational information.

The present embodiment, of course, also may utilize the timer 15 for determining when to display the soft keys on the display panel 21b, or may utilize the counting result by the counter 16, together with a time measurement obtained from the timer 15, for determining when to carry out the self-diagnosis or the display of the soft keys.

In the first through fourth embodiments, the number of times that the image forming operation is performed and counted by the counter 16 after the completion of a service event and the predetermined specific number of times (N jobs), is utilized as the period for reaching a determination judgment) as to whether the service result is good or bad. Thus, when the counting result x jobs reaches the predetermined number of times, N jobs (x=N), the self-diagnosis result or user determination is prepared representing the operational condition of the image forming operation carried out during that period.

However, when the N job is 100 jobs (N=100), a user who photocopies or prints out images frequently and/or in a large quantity can achieve the 100 jobs for the counting result x jobs in a short time thereby forcing the determination judgment) concerning the adequacy of the service (the service result) to be made shortly after the completion of the service event being judged. On the other hand, a user who makes only one or a few sheets of photocopy or printout each time he uses the digital composite machine 1, or a user who seldom uses the digital composite machine 1, requires a long time to achieve the 100 jobs count for the x jobs and therefore has a long time to make his determination concerning the adequacy of the performed service event.

Accordingly, the time shown in FIG. 9 is used so as to set a specific period, N time, in advance so that the operational information will be prepared at a time when x time, which is time measured by the timer 15, reaches a predetermined N time.

As in the previous embodiments, a management system and a management method for the digital composite machine 1 of the present embodiment send a service request to a service center 200. Then, the service center 200 transmits service instructions via E-mail to one of the S information terminals 2 carried by the respective service personnel. The service personnel visits the location of the user of the digital composite machine 1 via a service car and performs the various requested services on or in association with the digital composite machine 1.

Thereafter, the image forming operation is resumed. When the image forming operation is resumed, the timer 15 starts measuring the elapsed time since the completion of the service. In this case, the predetermined time period is N time so that the self-diagnosis section 13 diagnosis the digital composite machine 1 and/or the determination of the operational condition by the user is made when the x time measured by the timer 15 reaches the predetermined N time.

A service center 200 is notified of the self-diagnosis and/or user operational condition result as the service result, and in accordance with the service result, the service center 200 instructs a service personnel to repeat the service, or the service center 200 charges a user for the cost of the service.

It is preferable that the specific numerical value of the predetermined N time be changeable. As explained with regard to the previous embodiment, depending how the digital composite machine 1 is used, the frequency or period of its use following the completion of the service event may be quite different. Therefore, it is preferable that the numerical value of the predetermined time period can be altered depending how the user uses the digital composite machine 1. This ensures that the operational information prepared will be more accurate, thereby allowing the service personnel to more promptly respond to continuing trouble conditions.

As mentioned, in the first to fourth embodiments, the digital composite machine 1 first requests service, and then the service center 200 transmits the service instructions to the service personnel so as to provide the service to the digital composite machine 1. However, the present invention may also be so arranged as no to include these steps. In otherwords, it is contemplated that the present invention may have such an arrangement that, when a service request, such as a repair, a check, and renewal of consumptive goods, is accomplished by a conventional method, such as by telephone, the management method via E-mail is carried out the first requested service event is performed.

Sixth Embodiment

Figure 11:
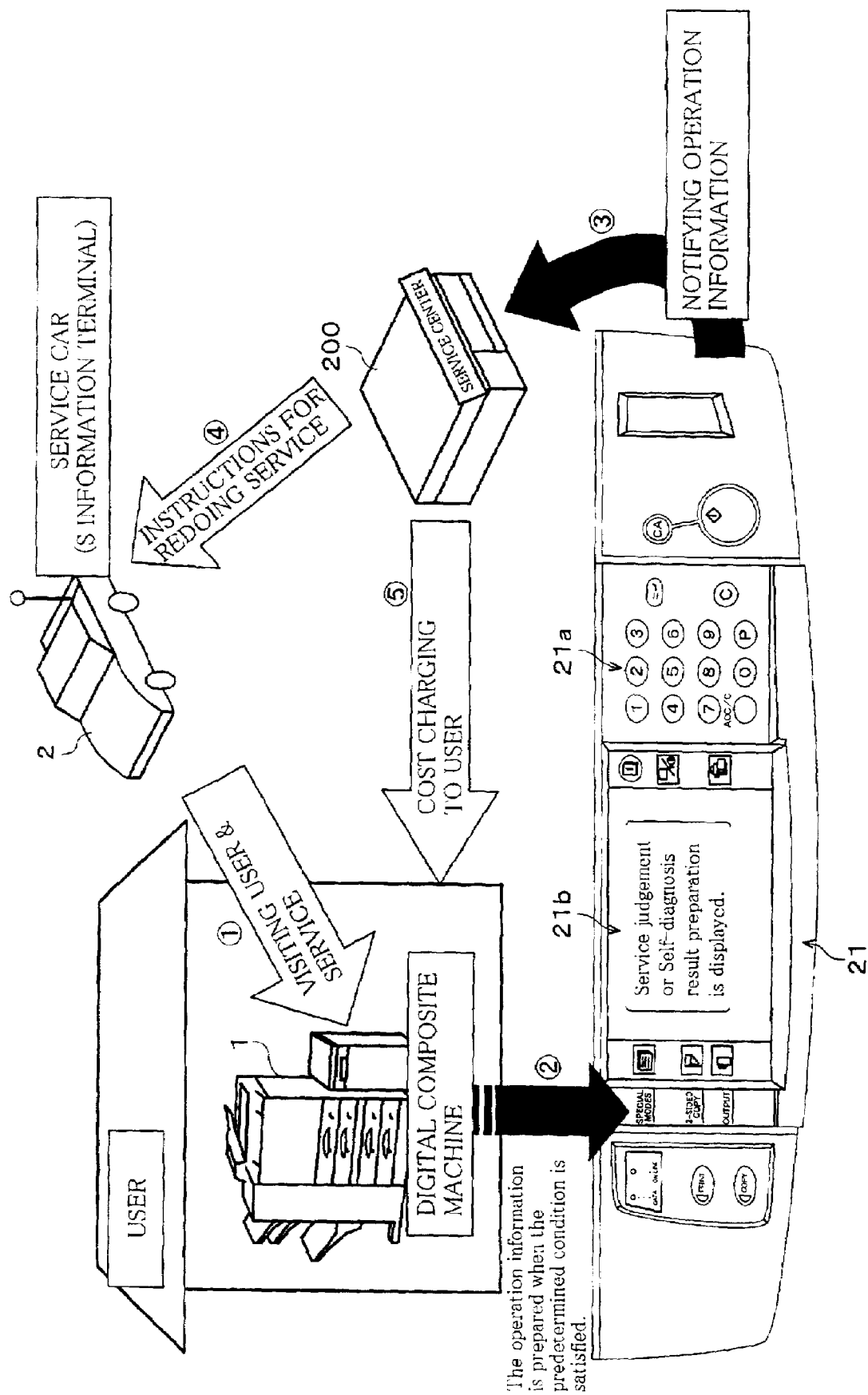
FIG. 11 is an explanatory view illustrating how operational information is prepared and transmitted, and how service is provided to a user in a management system for an electronic apparatus in accordance with a sixth embodiment of the present invention.

A sixth embodiment of the present invention now will be described with reference to FIG. 11. Again, the present invention is not limited to this embodiment, and for convenience of explanation, sections identical with those used in any of the first to fifth embodiments are identified by the same reference numerals, and a full explanation of those sections is omitted here.

In the first to fifth embodiments the service center 200 and the service personnel dealt with (responded to) trouble conditions or events, in the present embodiment, however, explains an example where a service center 200 and a service personnel deal with a trouble condition or event subsequent to an original provision of service.

The management system of the present embodiment is the same as those of the first to fifth embodiments, except that a control section 12 requests, via E-mail, the service center 200 to provide a service.

For example, with the arrangement provided with a counter 16 as shown in FIG. 1, 3 or 7, the predetermined number of times that the image forming apparatus forms an image after the completion of a service (i.e., N jobs) is set as the predetermined specific condition. Then, as shown in FIG. 11, the service personnel visits the user's location and provides a service. Subsequently, the digital composite machine 1 is used as usual until a counting result of a counter 16 (x jobs) reaches N jobs (in other words, N sheets of photocopy or printout are made). Operational information is prepared, and the service center 200 is notified of the operational information.

Depending how often the digital composite machine 1 is used after the service, the digital composite machine 1 may develop various trouble conditions. Therefore, in the above arrangement where the counter 16 is used for counting how many times the image forming operation is carried out following the completion of a service event, the operational information is prepared after each N jobs, and transmitted to the service center 200. In this manner, a regular check is provided to the digital composite machine 1 after the completion of service, thereby providing more prompt responses to trouble conditions.

Moreover, regardless of the frequency of the use of the digital composite machine 1, various sections may deteriorate or malfunction after a predetermined N time. Therefore, if a timer is provided for measuring elapsed time as the fifth embodiment, the operational information may be prepared each time a predetermined time N has passed since the completion of a service event for transmission to the service center 200. This also makes it possible for the service center and the service personal to respond more promptly to a trouble condition/event.

A description of the steps of instructing a repeat of the service and charging for the service are omitted here because they are identical with the corresponding steps of each of the foregoing embodiments.

Furthermore, even though it is not specifically shown here, a self-diagnosis section 13 may be provided for making all required judgments automatically, as the second embodiment. Further, when the image forming operation is carried out at an excessively low frequency, the control section 12 may control the predetermined time measured by the timer 15 used as a reference such that image forming section 20 is caused to carry out the image forming operation a predetermined number of times within the predetermined time so as to allow for the performance of appropriate self-diagnosis.

Seventh Embodiment

A seventh embodiment of the present invention now will be described with reference to FIG. 12. Again, the present invention is not limited to this embodiment, and for convenience of explanation, sections identical with those used in any of the first to sixth embodiments are identified by the same reference numerals, and a full explanation of those sections is omitted here.

In the first through sixth embodiments, the digital composite machine 1 includes self-diagnosis section 13 and E-mail communication section 11 installed inside the digital composite machine 1 (see FIGS. 1, 3, 7 and 9). The present invention, however, is not limited to this. For example, another information communications apparatus having at least a self-diagnosis function and an E-mail communication function may be externally attached to digital composite machine 1c (an electronic apparatus) such that the digital composite machine 1c is provided with information communication means that corresponds to that of the information communication section 10 (see FIGS. 1, 3, 7, and 9).

Figure 12:
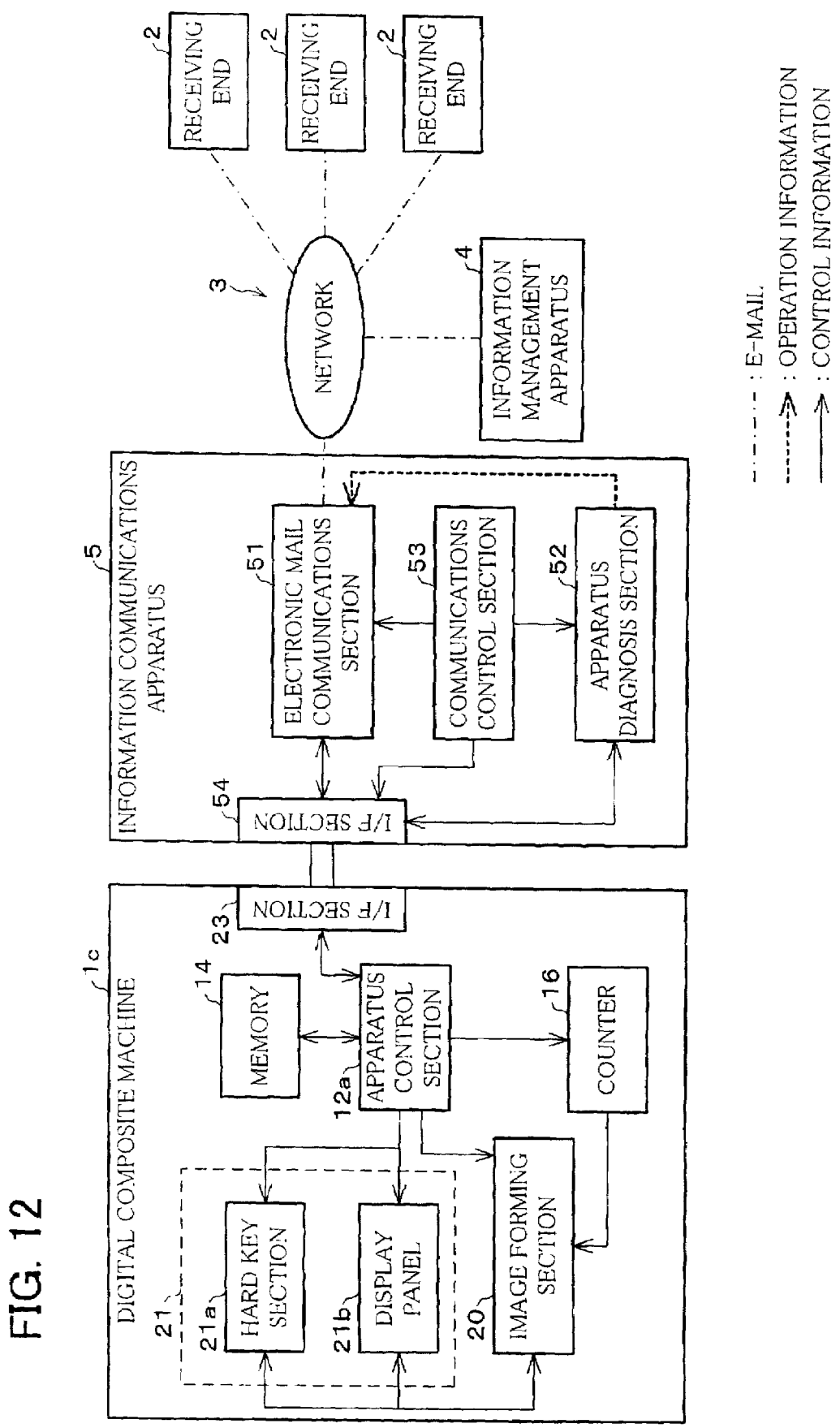
FIG. 12 is a block diagram showing an example in which a management system for an electronic apparatus of a seventh embodiment of the present invention is employed for managing a digital composite machine.

More specifically, as shown in FIG. 12, a management system of the present embodiment is provided with an information communication apparatus 5, which is externally attached to the digital composite machine 1c. The digital composite machine 1c is identical to digital composite machine 1, with the exception that the digital composite machine 1c has no section that corresponds to the information communication section 10. Therefore, the digital composite machine 1c is provided with an image forming section 20, an operation panel 21 (including a hard key section 21a and a display panel 21b), an apparatus control section 12a, a memory 14, a counter 16, other well-known sections, and an interface section (I/F section) 23.

On the other hand, the information communications apparatus 5 is provided with an E-mail communication section (apparatus communications means; notifying means; trouble notifying means) 51, an apparatus diagnosis section (self-diagnosis means; an operation condition checking section; a preparation section; operation information preparation means) 52, a communications control section (control means) 53 and an interface section (I/F section) 54.

The E-mail communication section 51 includes communication means for transmitting and receiving E-mail via network 3, which is identical with that utilized by the E-mail communication section 11. The apparatus diagnosis section 52, which corresponds to the self-diagnosis section 13, diagnoses (determines) the condition of the digital composite machine 1c and prepares a diagnosis result (operational information). The I/F sections 23 and 54 are means for communication between the digital composite machine 1c and the information communication apparatus 5. The communication control section 53 controls all operations of the information communication apparatus 5, particularly those transmitting the diagnosis result (the operational information) to a predetermined receiving end via E-mail communication section 51.

Because the I/F section 54 of the information communications apparatus 5 is connected to the I/F section 23 of the digital composite machine 1c, the digital composite machine 1c of the present embodiment is identical in function to digital composite machine 1 that has a self-diagnosis function and an E-mail communication function as discussed above concerning the second embodiment of the present invention. Further, the function of the information communication apparatus 5 is identical with corresponding apparatus of the first to sixth embodiments. Therefore, further discussion of the function of that apparatus is omitted here.

Therefore, the management system for an electronic apparatus of the present invention can include the digital composite machine 1c by merely externally attaching information communication apparatus 5 thereto. This is the case even though the digital composite machine 1c does not have a self-diagnosis function or an E-mail communication function. In otherwords, it is possible to expand the application of the management system of the present invention to different apparatuses, thereby allowing the management system to be used more widely.

In addition, with the arrangement where the information communication apparatus 5 is externally attached to a digital composite machine as in the present embodiment, an individual user having a plurality of digital composite machines 1c can connect a single information communication apparatus 5 to each of the plural digital composite machines 1c.

Eighth Embodiment

In the respective forgoing embodiments, cases have been discussed in which operational information is prepared based upon the condition of a digital image forming apparatus after an image forming operation has been carried out a predetermined number of times, or a predetermined period of time has passed since the performance of a service event. In the present embodiment, however, operational information is prepared based upon a different condition of the digital imaging apparatus, that is, when a trouble condition/event is detected during a supervision of the operational condition of a function of the digital imaging apparatus. The present embodiment is explained below with reference to FIG. 14.

Specifically, the following is a description of a case in which the hardware arrangement is substantially identical with that shown in FIG. 7. In this arrangement, a user is requested to determine whether or not the operation of the digital imaging apparatus is normal after the operation of the apparatus has been carried out for a predetermined time after service was performed, and the user is charged for the cost of the service after it is confirmed that the operation of the digital imaging apparatus is normal, as in the fourth embodiment. However, if a self-diagnosis section 13 is provided, it is also possible to adapt the arrangement of the elements of the present invention such that the cost of the service is charged at a different time, and such that the operational information is prepared only in accordance with the self-diagnosis result, without requesting the user to judge the operational condition of the apparatus.

For example, a self-diagnosis section 13 of digital composite machine 1 diagnoses, or a user judges might determine that a first cassette of a digital composite machine 1 has paper jam quite often. In that case, the digital composite machine 1 or the user of the digital composite machine 1 requests service from a service center 200, as the respective foregoing embodiments. If the digital composite machine 1 is made to spontaneously request service, however, the E-mail service request includes information allowing a receiving end to specify the digital composite machine 1, a message specifically explaining the type of the trouble (i.e., "High occurrence of paper jam in the first cassette"), and a service request message (i.e., "Request for checking"). If the user requests the service, similar information is provided to the service center 200 by telephone or by facsimile.

The service center 200 that has received the request for checking transmits service instructions to an S information terminal 2 carried by a service personnel. The "service instructions" include information identifying the user who has sent the request for checking (for example, an address of the user, a type of the digital composite machine 1, and/or the optional unit arrangement of the digital composite machine of the user), and the type of trouble to be corrected. Moreover, the service center 200 also transmits information concerning parts or goods that require maintenance (such as a sheet feeding roller), and information concerning previous services provided to the digital composite machine of the user (service history) to the S information terminal 2 for the sake of more efficient service. Thus, for example, if there is a database that correlates various types of trouble conditions/events with their respective causes and/or solutions, it is also possible to search that database for trouble conditions/events similar to the trouble condition/event reported to the service center, so that that information may be provided to the S information terminal 2.

The service personnel who receives the service instructions visits the location of the user who transmitted the request for checking, and provides the necessary service. In the specific exemplary case described, the feeding operational condition of the first cassette is checked to identify the part thereof (a section) causing the trouble. If necessary, the part is renewed (i.e., replaced). For example, if the trouble (high occurrence of the paper jam) is caused by "slipping" due to a worn-out rubber portion of the sheet feeding roller, the service personnel renews (replaces) the sheet feeding roller mounted on the digital composite machine 1 with a renewal part (a new or rebuilt sheet feeding roller) that the service personnel brought with him. The feeding operation of the first cassette then is checked again after the renewal (replacement). The service is completed when the result of the last described checking is that the trouble has been solved.

Sometimes, however, a trouble event has more than one cause. Therefore, even if one cause is solved, there may be another previously unnoticed trouble condition present. Thus, it is important to continue to supervise (monitor) the operation of the digital composite machine 1, after the service.

Figure 14:
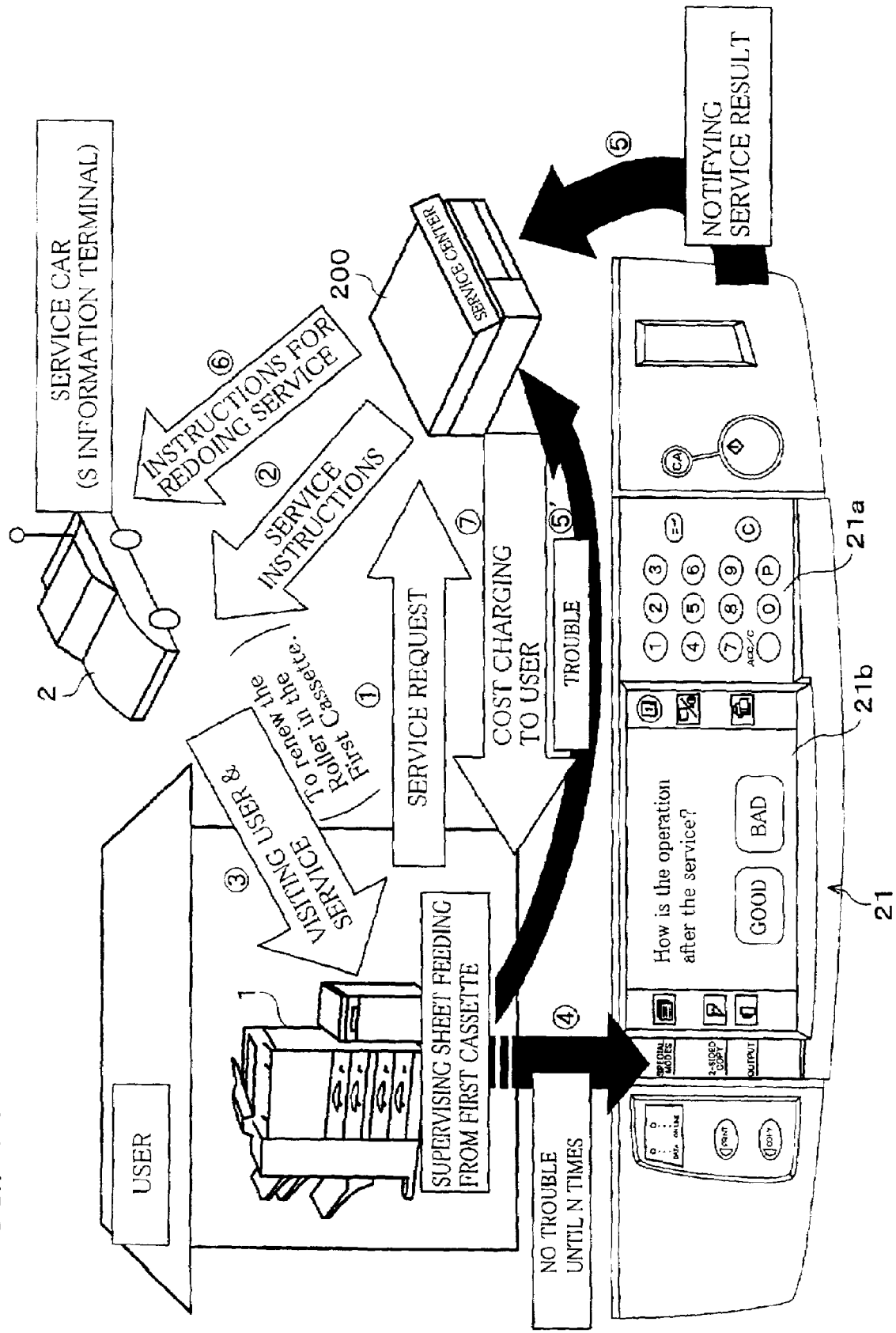
FIG. 14 is an explanatory view illustrating how operational information is prepared and transmitted, and how service is provided to a user in the management system for the electronic apparatus of an eighth embodiment of the present invention.

In the present embodiment, the digital composite machine 1 is placed under the supervision of the self-diagnosis section 13 until the predetermined conditions are satisfied so as to ensure that its operation is normal. If a trouble condition/event is detected, the control section 12 simultaneously instructs E-mail communication section 11 to transmit an E-mail to the information management apparatus 4 (the service center 200). The E-mail contains the operational information to describe the nature of the trouble. For example, in the above example, the digital composite machine 1 supervises the feeding operational condition of the first cassette until the number of times paper is fed from the first cassette reaches a specific value (N number of times). If a paper jam is caused, as shown in FIG. 14, the digital composite machine 1 spontaneously sends a confirmation result, which indicates a trouble condition/event found during confirmation of the operational condition of the digital composite machine via E-mail. In this way, the service center 200 can understand that a trouble condition/event has arisen and the nature thereof. This enables the service center 200 to take appropriate corrective measures, such as giving further service instructions.

If, on the other hand, no trouble is detected until the predetermined conditions are satisfied, the digital composite machine 1 displays a message regarding the operational condition on the display panel 21b as shown in FIG. 8(a), and requests the user to confirm the operational condition as shown in FIG. 14. Then, the digital composite machine transmits the confirmation result received from the user and the self-diagnosis result via E-mail. On the other hand, if the service center 200 receives user's confirmation result informing it that the operational condition of the digital composite machine is good, cost of the service is charged to the user. On the other hands, if the user's confirmation result or the self-diagnosis result informs the service center 200 that a trouble condition/event (such as a malfunction) is detected, the service center 200 responds by giving instructions for providing a repeat of the service.

The digital composite machine 1 of the present embodiment, therefore, supervises the operational condition of the parts which have been serviced until the predetermined conditions are satisfied. If a trouble condition/event is detected, the digital composite machine 1 automatically contacts the service center 200. This allows the service center 200 to understand that a trouble condition/event has occurred, when the trouble condition/event occurred, and to promptly respond to the trouble condition/event. Moreover, it is necessary to carefully supervise only the parts that have been renewed (replaced) until the predetermined condition for checking the normal operation of the digital composite machine has been satisfied. Therefore, it is possible to supervise those sections of the digital composite machine 1 that tend to encounter trouble without placing undue additional workload upon the digital composite machine.

It should be noted in the above regards that in the present embodiment as in the fourth embodiment, the operational information is prepared based on both the user's confirmation and the self-diagnosis result. This in a more accurate judgment regarding the operational condition of the digital composite machine than is possible where only one of these inputs is so utilized.

Ninth Embodiment

In the eighth embodiment, an example was explained where the condition indicating when a judgment to be made that the operation is normal is constant. On the other hand, in this ninth embodiment, the condition for making the judgment (for example, the number of times that the digital composite image device is operated following a service event) is changeable according to, for example, trouble frequency or trouble level.

A digital composite machine 1 of the present embodiment uses a memory 14 (shown in FIG. 7) to store information that indicates a frequency of trouble occurrence, such as, sheet-feeding information from each cassette (jam frequency log). In the present embodiment, as shown in FIG. 15, control section 12 of the digital composite machine 1 counts, for each cassette, how many sheets are jammed out of 100 sheets that have been fed so as to prepare a jam frequency log. Since the jam frequency log is updated constantly, any sudden increase in jam frequency can be detected.

The jam frequency is not only a numerical value that is suitable to show objectively trouble conditions/events sensed by a user, but also may be utilized to indicate the user's is dissatisfaction level (a level of a request for checking). Therefore, the jam frequency after a service event has been performed should be lower than before the service. Otherwise, the user will not feel that the trouble has been solved, and his confidence in the reliability of the service will deteriorate.

To avoid this problem, the digital composite machine 1 of the present embodiment refers to the jam frequency log stored in the memory 14 so as to determine how long the operational condition should be supervised. In this way, a length of a period of the supervision may be so set that a trouble condition/event would be expected to occur during the period of supervision if the frequency of trouble conditions/events remains at the same level as the frequency of trouble conditions/events at the time when the instructions for checking were issued.

Thus, as shown in FIG. 15, in a case where the jam frequency is 20% according to data stored in the memory 14 when checking was requested, that means that one out of five sheets were jammed. Therefore, after the service, the supervision of jamming occurrence is carried out while five sheets are fed. If no jam is caused during that period, it is assumed that the frequency of jamming has improved.

In the present embodiment, when the frequency of a trouble condition/event happens to be low during the period of the supervision, the period of the supervision is set to supervise the feeding of sheets until a number of sheets which is calculated by multiplying the frequency of jamming by a predetermined ratio (for example, 10 times) so as to be sure the trouble condition has improved. In the above example, because the log in the memory 14 indicates that the frequency is one out of five sheets, self-diagnosis section 13 supervises the feeding of sheets for jam occurrence until 50 sheets have been fed.

This allows service center 200 to surely detect a trouble condition/event if it is caused at the trouble condition/event frequency determined at the time the checking is requested. As a result, if the service fails to lower the frequency of trouble conditions/events, the service center 200 is able to respond to the problem, for example, by repeating the service, without requiring further input by the user. This prevents a deterioration in the user's confidence in the service center and the reliability of the service.

In addition, it is preferable that apparatuses of a service provider, such as the service center 200 or an S information terminals 2, store frequency of the trouble (the jam frequency log) information at the time that checking is requested. In this way, the service center 200 can show a user who has requested checking that, in fact, the trouble condition/event has not occurred during the period of the supervision, and that the frequency of the trouble condition/event at the time (jam frequency) when the checking is requested has been improved. Because the conditions (frequencies) of trouble conditions/events before and after the performance of service can be presented objectively, it is possible to confidently explain the concrete effect of service to the user. This provides a management system that can win confidence and reliability of the user.

Further, in some cases the period during which the operation of the digital composite machine 1 is supervised, as in the eighth and ninth embodiments, when service has been provided to solve more than one trouble condition/event at the same time, each trouble condition/event is supervised for a separately determined different period of time. Thus, the periods of supervision to ensure the reduction of each of the respective trouble conditions/events commonly end at different times.

FIG. 16 is an example where jam frequently happens in two cassettes (for-example, a first cassette and a third cassette), and service has been requested for both the first and third cassettes. In this case, if the number of times that the operation is carried out (how many sheets are fed) is utilized for confirming the result of the service is set in the same manner as above, 50 sheets for the first cassette and 25 sheets for third cassette are to be fed in order to confirm the result of the service. Therefore, the supervision for the first cassette is ended when the first cassette feeds 50 sheets, while that for the third cassette is finished when the third cassette feeds 25 sheets.

As a comparative example, if the digital composite machine 1 sends to the service center 200 results respectively at each end of a period of the supervision, it is impossible for the service center 200 to judge whether both of the services are completed normally, after only one of the confirmation results has been received. Thus, the service center cannot charge the cost of the service when only one of the service results has been received. Moreover, because some trouble conditions/events are caused by plural factors (parts or units) that interrelate with each other, only one of the confirmation results is not enough for making a complete judgment as to whether the service as a whole is adequate.

In addition, when service results are reported with reference to judgment determinations inputted by the user, it is necessary to request the user to give instructions at each end of the periods of supervision.

In the case where plural supervision periods are set, however, the digital composite machine 1 of the present invention seeks the user's input when all the supervision periods have ended, and transmits to the service center 200 the service result including the results of the inquiry to the user and the self-diagnosis results for the respective parts under supervision. Since the digital composite machine 1 reports all the results together (at once), it is only when all the results have been obtained that the service center 200 can make a determination of the service result as a whole. Consequently, it is possible to perform steps such as instructing a repeat of the service or charging effectively and promptly only after all service results have been received. In addition, in the present embodiment, because the service center 200 is notified of a trouble condition/event when the it occurs, even if a service result regarding one of the supervised functions is reported later, it remains possible to promptly respond to the reported trouble condition/event.

Tenth Embodiment

In the first to ninth embodiments, the digital composite machine 1 transmits the operational information to the information management apparatus 4 (service center 200) for managing the maintenance of the parts or units that caused trouble. On the other hand, in a present embodiment, a digital composite machine 1 is provided with a printer board 101 so that the digital composite machine 1 may be used as a network printer. FIG. 17 illustrates the case where such a network printer is used having plural receiving ends for the operation information. The destination (one of the receiving ends) of the operational information is selected (maybe, as one of the receiving ends other than the service center 200, or in addition to the service center 200), depending on the trouble condition/event, even if a same part or unit has the trouble.

Where the digital composite machine 1 is used as a network printer, the digital composite machine 1 is connected, as shown in FIG. 17, with a user's terminal 7 and a management terminal 8 via a local area network (LAN) 6 such as Ethernet (registered trade mark). The user's terminal 7 and the management terminal 8 are, for example, computers such as personal computers. The user's terminal 7 is used by a common user who uses the network printer (the digital composite machine 1). On the other hand, the management terminal 8 is a terminal used by a manager who manages the LAN 6. The manager uses the management terminal 8 to perform network setting such as setting an address of each apparatus in the LAN 6. In addition, the LAN 6 is also connected with a gateway 9. The apparatuses in the LAN 6, such as the digital composite machine 1, can communicate with an information management apparatus 4 (service center 200) via the gateway 9 and a network 3.

In the above system in which the digital composite machine 1 and another machines (the user's terminal 7) communicate each with other, a trouble condition/event of the digital composite machine 1 may have its cause in the user's terminal 7 or the LAN 6, in addition to in the digital composite machine 1 itself. Meanwhile, the manager is more familiar with apparatuses used in the LAN 6 as compared with ordinary users, and may be able to solve the trouble without contacting the service center 200.

For example, in a case in which the digital composite machine 1 does not detect the printer board 101, there are some cases where the service center 200 should respond, such as a breakdown or improper installation of the printer board 101. There also are other cases in which the manager of the LAN 6 should respond, such as inadequate network setting. Moreover, when a function which has not expanded yet is set in a printer driver of the user's terminal 7, it is desirable that the user or the manager, who can give instructions to the user, deal with the trouble condition/event, instead of the service center 200. This is because the printer configuration is mistakenly set by an improper operation by the user. On the other hand, when data processing is not possible due to overcapacity of the memory 14, there are some cases where the service center 200 should respond to the trouble condition/event, such as when the digital composite machine 1 is provided with a memory not having enough capacity for the printing process. There are other cases in which the user or the manager, who can advise the user, should respond to the trouble condition/event, such as where output instruction data from the user's terminal 7 is extraordinarily large, or where a character impossible to output is requested for the printing.

The digital composite machine 1 of the present embodiment, as shown in FIG. 18, stores in the memory 14 a table for response in which descriptions of trouble conditions/events correspond to predetermined receiving ends. Thus, when self-diagnosis section 13 detects a trouble condition/event, the control section 12 refers to the memory 14, and controls the E-mail communication section 11 accordingly to send an E-mail, which contains the operational information, to the correct receiving end for solving the trouble. In this way, the digital composite machine 1 transmits the operational information to the receiving end, thereby responding to the trouble condition/event in a timely and effective manner.

Thus, when the digital composite machine 1 fails to detect the printer board 101, the message "No printer board 101 is detected" is displayed and the digital composite machine 1 refers to the memory 14 and notifies the management terminal 8 and the information management apparatus 4 (the service center 200) concerning the trouble. In this way, the service center 200 checks whether the printer board 101 is broken, or improperly installed by dispatching a service personnel, while the manager of the LAN 6 checks the network setting of the LAN 6.

On the other hand, when the trouble condition/event that "A function which has not expanded yet is set in a printer driver of the user's terminal 7" is detected, the digital composite machine 1 transmits the operational information to the management terminal 8 and the user's terminal 7. In this way, the user checks the printer driver of the user's terminal 7 by himself or in accordance with advice given by the manager, so as to ensure that the printer configuration of the printer driver is properly set. Furthermore, when the trouble condition/event that "Data cannot be processed due to the overcapacity of the memory" is detected, the digital composite machine 1 transmits the operational information to the user's terminal 7, the management terminal 8, and the service center 200. In this way, the service center 200 (a) refers to a database in which a history of the service is stored, (b) checks the digital composite machine 1 via a network 3, or (c) checks the memory capacity in case the operational information includes information about the memory capacity, so as to check whether the memory capacity of the memory 14 provided in the digital composite machine 1 is large enough. If the memory capacity is not enough, the service center 200 can increase the memory capacity of memory 14 of the digital composite machine 1, for example, by dispatching a service personnel. Moreover, in accordance with his own precaution or the advice given by the manager, the user can be careful not to give the digital composite machine 1 instructions to output improper data (data that cannot be outputted by the digital composite machine 1), or extraordinarily large data, when the user operates the user's terminal 7.

Furthermore, the digital composite machine 1 of the present embodiment sends to a receiving end, that is contacted when the trouble condition/event is detected, the operation confirmation result after the trouble condition/event is solved. In this way, each receiving end can choose the next step promptly and accordingly. For example, if the manager cannot respond to a trouble condition/event, the manager can contact the service center 200 for requesting the service, or if the operation of serviced parts is proved to be normal, the service center 200 can chare the cost of the service.

Eleventh Embodiment

In an electronic apparatus, for example a digital composite 1, which is able to expand its function by an optional unit attached thereto, the attachment of the optional unit gives the electronic apparatus another function associated with the unit. In the present embodiment, an arrangement wherein operational information is transmitted when a unit is added, in addition to or instead of the arrangement in which the operational information is transmitted after the provision of the services, such as the renewal (replacement) of the units or parts, is described.

Figure 19:
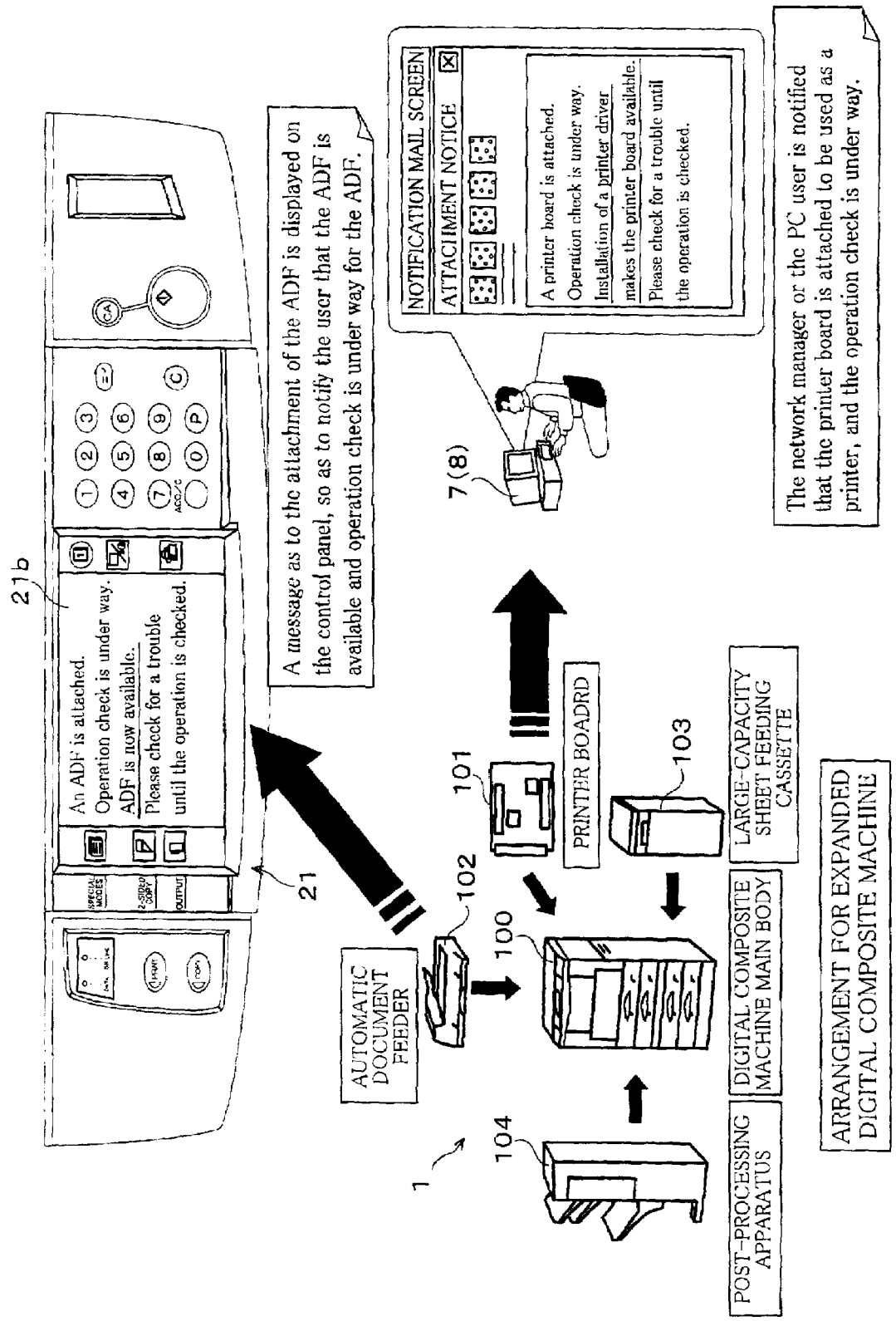
FIG. 19 is an explanatory view showing an example where a management system for an electronic apparatus of an eleventh embodiment of the present invention is employed for managing a digital composite machine including units capable of being attached to the digital composite machine main body, and notices concerning the attachment of each unit.

As shown in FIG. 19, a digital composite machine 1 of the present embodiment is provided with a printer board 101, an automatic document feeder (ADF) 102, a large-capacity sheet feeding cassette 103, and a post processing apparatus 104, to expand functions of the digital composite machine main body 100. The printer board 101 makes it possible to print out a digital document (data) transmitted from a personal computer such as the user's terminal 7 discussed above via a LAN 6 or a serial interface. The automatic document feeder 102 can automatically feed documents. The large-capacity sheet-feeding cassette 103 can load a larger quantity of printing paper than the digital composite machine main body 100. The post-processing apparatus 104 can carry out an offset process of the outputted sheet or bookbinding processes such as stapling.

Figure 20:
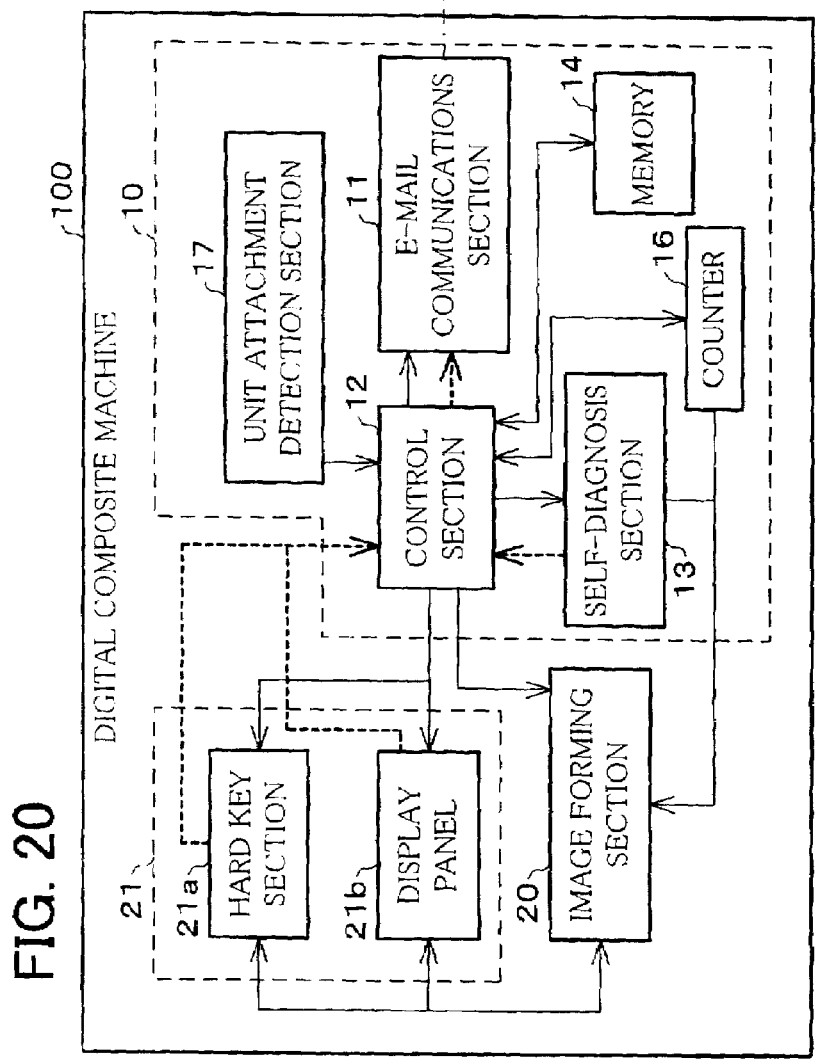
FIG. 20 is a block diagram showing an example in which a management system for the electronic apparatus is employed for managing a digital composite machine.

The digital composite machine main body 100 of the present embodiment is provided with, in addition to the arrangement of the digital composite machine 1 of any one of the respective forgoing embodiments, a unit attachment detection section (detecting means) 17. The unit attachment detection section 17 detects whether an optional unit is attached or not, as shown in FIG. 20. Moreover, a memory 14 stores the receiving ends so that a correct receiving end is contacted for each unit that has been attached.

In addition, FIG. 20 shows an example where the unit attachment detection section 17 is provided in the digital composite machine 1 of the ninth embodiment of the present invention (see FIG. 7). In the case of the arrangement shown in FIG. 12, it is possible to provide the unit attachment detection section 17 in either the digital composite machine 1c or the information communications apparatus 5. In the case of the arrangement shown in FIG. 12, it is possible to provide the unit attachment detection section 17 partially in both the digital composite machine 1c and the information communications apparatus 5 so that the digital composite machine and the information communication apparatus 5 communicate each other via the I/F sections 23 and 54 so as to cooperate with one another.

In the above arrangement, when the unit attachment detection section 17 detects that an optional unit is attached to the digital composite machine 1, a control section 12 refers to the memory 14, and transmits operational information to a receiving end that is suitable for the unit attached thereto.

Figure 21:
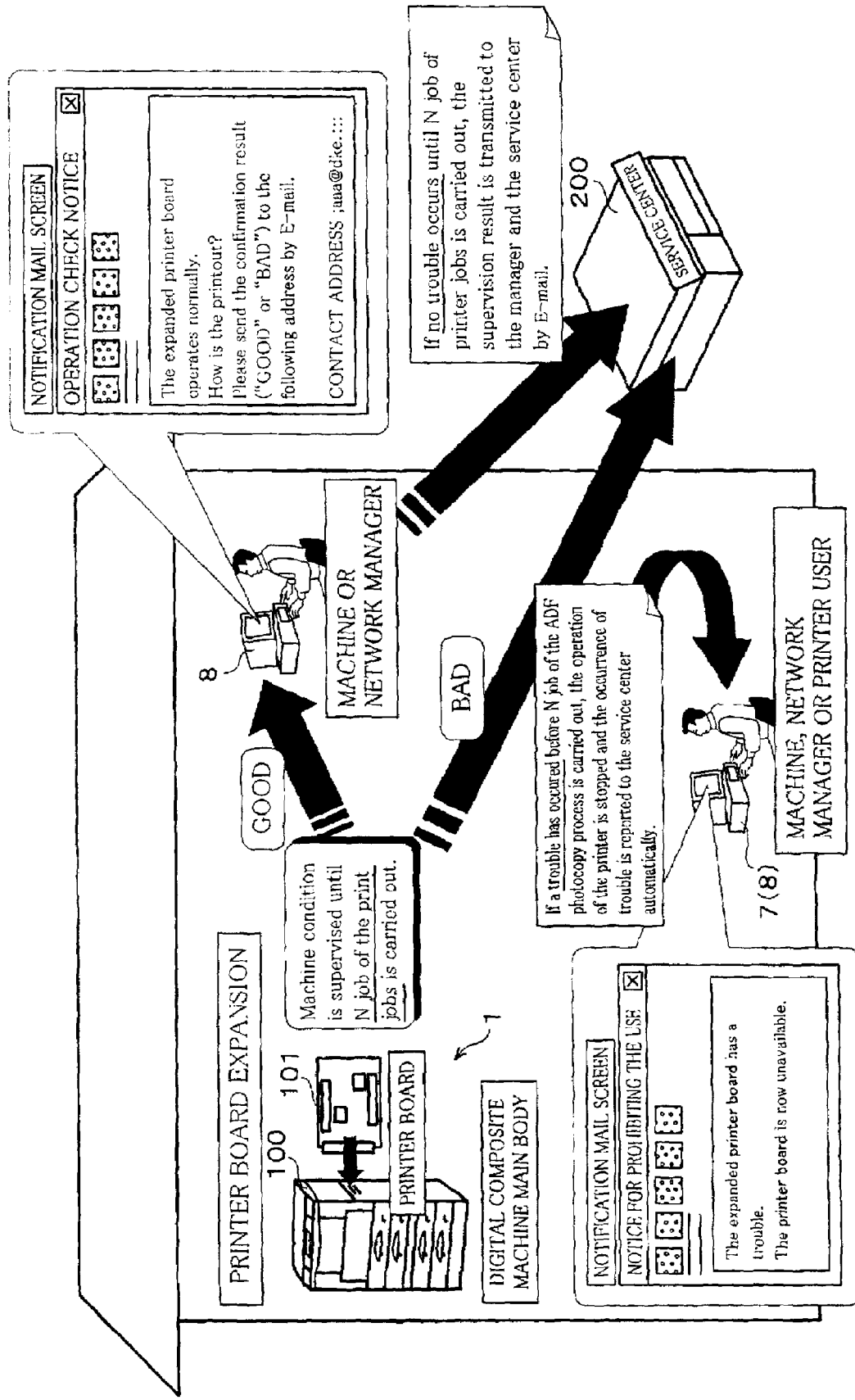
FIG. 21 is an explanatory view showing how operational information is prepared and transmitted when a printer board is attached to a digital composite machine main body.

FIG. 21 shows an example, in which the unit attachment detection section 17 provided in the digital composite machine main body 100, detects attachment of printer board 101 to the digital composite machine main body 100. The control section 12 reads out the receiving end for the printer board 101. The memory 14 indicates that a user of the printer board 101 is the receiving end for the printer board 101. In this case, the control section 12 instructs an E-mail communication section 11 to transmit an E-mail to each user of the printer board 101, so as to inform the respective users of operational condition that the digital composite machine 1 can be used as a printer.

On the other hand, users, who receive the notice, install a printer driver into their user's terminal 7. In this way, the user's terminal 7 can utilize the digital composite machine 1 as a network printer.

Thereafter, the digital composite machine main body 100 supervises the operational condition of the unit that has been attached thereto until a condition set for judging that the operation of the unit is normal (for example, until the operation is carried out in a predetermined number of times) is satisfied. Similarly to the case where the parts are renewed (replaced), if a trouble condition/event is detected during the supervision period, by referring to the memory 14, the control section 12 of the digital composite machine main body 100 determines what predetermined receiving ends are receiving ends for that kind of trouble condition/event information, such as service center 200, management terminal 8 or the user's terminal 7. The control section 12 instructs the E-mail communication section 11 to transmit to the receiving end an E-mail that includes the operational information.

Upon receipt of the operational information, service center 200 carries out the service, such as by instructing an S information terminal 2, dispatching a service personnel, or giving advice the user concerning how to solve the problem. When the management terminal 8 receives the operational information, the manager checks the network setting of the LAN 6 in accordance with the operational information, so as to solve the trouble condition/event, for example, by correcting an inadequate part of the network setting. Furthermore, when the user's terminal 7 receives the operational information, and the user is notified of a trouble condition/event in the unit, the user deals with the trouble by canceling the outstanding printout of data, or by using another printer for printing.

If a trouble condition/event is detected, or if normal operation cannot be detected after the attachment of an optional unit, it is preferable that control section 12 of the digital composite machine main body 100 stops the operation of the optional unit forcibly by instructing the unit to stop its operation or by stopping instructions to operate the unit. In this case, it is possible to avoid the continued operation of the unit experiencing the trouble condition/event and thereby to avoid the consequences of a consecutive trouble condition/event, such as further worsening damage to the optional unit.

If the digital composite machine 1 is used as the network printer, assistance of the manager of the LAN 6 is indispensable for operating the network printer properly. This is because the network printer is largely affected by the setting of the network (the LAN 6). In most cases, the manager can solve problems associated with the network printer. Further, it is possible to register only the management terminal 8 as the receiving end. In those cases where the cost of requested service is assessed to the user by the service center 200, it is preferable that the digital composite machine main body 100 request the user to indicate whether the user wants to request the service, or not, by using the display of the display panel 21b, and that the user inputs his answer before the transmittal of the operational information to the service center 200 for requesting the service. This makes possible the limitation of requests to the service center 200 for the service to only those situations wherein the request was made in accordance with user's instructions, such as when the user's instructions are inputted by the user into an operation panel 21.

Furthermore, when a trouble condition/event is solved by renewing (replacing) the printer board 101, or by correcting the network setting, as a result of the service or the response by the manager, the digital composite machine main body 100 transmits an E-mail notifying the users of the network printer that the digital composite machine 1 can be used as a printer.

When no trouble is detected during the supervision period, the control section 12 requests the user to indicate whether there is any trouble or not, by means of the display shown on a display panel 21b. When the user's answer is inputted into operation panel 21, control section 12 prepares operational information in accordance with a self-diagnosis result given by the self-diagnosis section 13 and the answer inputted by the user, and sends the operational information, by controlling E-mail communication section 11, to a predetermined receiving end for a time when normal operation is confirmed. Such a predetermined receiving end maybe, for example, service center 200. In this way, service center 200 can ascertain that the printer board 101 is attached to the digital composite machine main body 100, and operates normally. Moreover, if the user requests a service from the digital composite machine main body 100 thereafter, service center 200 can determine how to deal with the trouble condition/event for which the service is requested, by virtue of the fact that service center 200 has received a report that the printer board 101 is operating normally.

Figure 22:
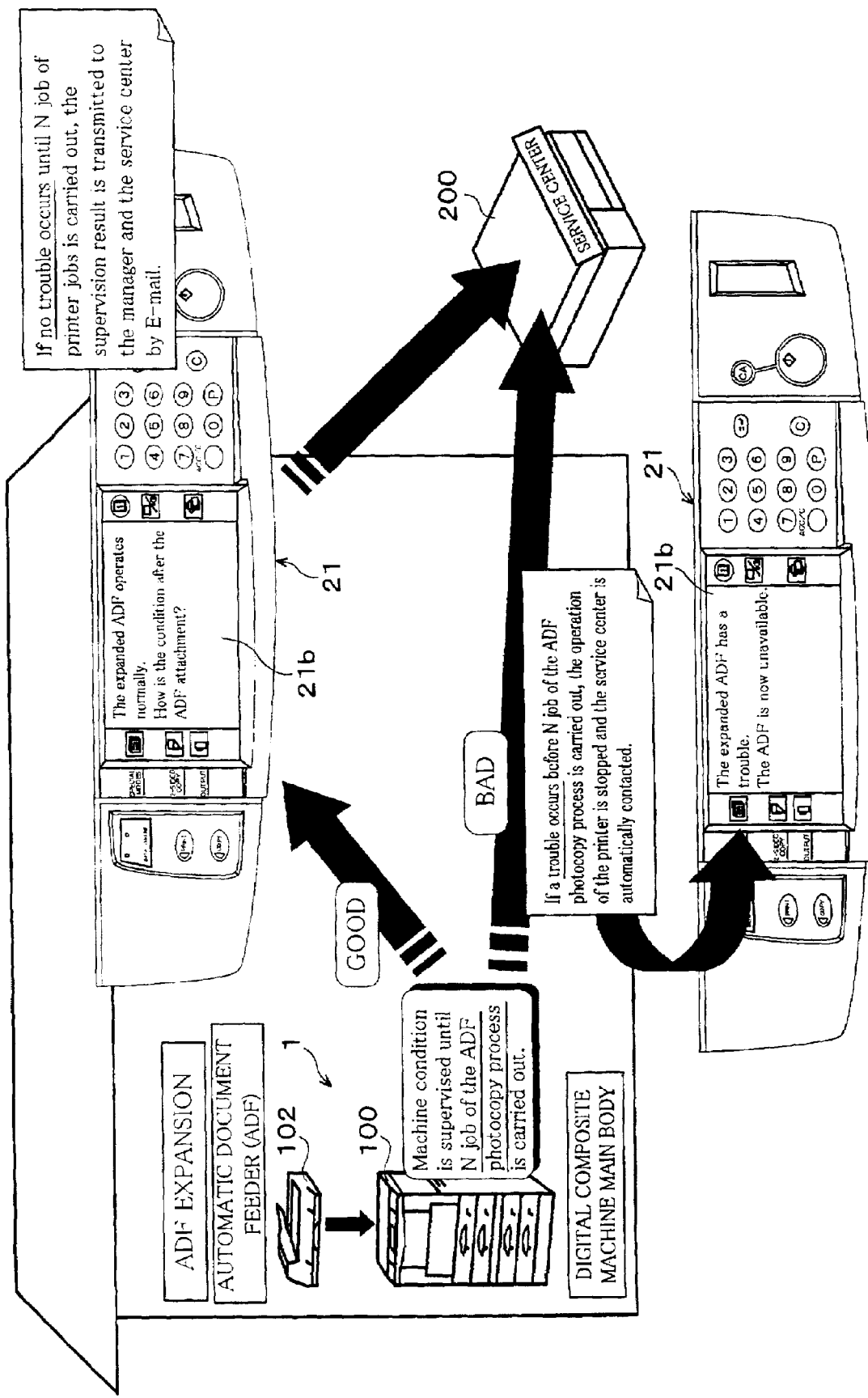
FIG. 22 is an explanatory view showing how operational information is prepared, transmitted and received, when an automatic document feeder is attached to a digital composite machine main body.

On the other hand, as shown in FIG. 22, if the digital composite machine main body 100 is provided with automatic document feeder 102, the digital composite machine 1 is able to automatically feed sheet, thereby, for example, automatically exchanging the sheets when making a photocopy. Here, it is assumed that a user of automatic document feeder 102 goes to the location of digital composite machine main body 100 in order to operate the digital composite machine main body 100, contrary to the case the digital composite machine 1 operates as the network printer. Therefore, control section 12 of digital composite machine main body 100 refers to the memory 14 and displays on the display panel 21b a message indicating that the automatic document feeder 102 is available, as a notice to users of the automatic document feeder 102.

After the automatic document feeder 102 is attached, a first user to use the digital composite machine 1 checks the display panel 21b of the digital composite machine main body 100, and operates operation panel 21 so as to set various copy functions. Thus, when the automatic document feeder 102 is attached, the digital composite machine main body 100 displays on the display panel 21b a message indicating that the automatic document feeder 102 is available. Therefore, the user is informed that the digital composite machine 1 has a new function simply by looking at the display panel 21b. In addition, when the operational information is transmitted in case of a trouble condition/event or the end of a supervision period, the transmission of information is carried out in the same manner as in the case where the printer board 101 is attached.

It is to be understood that, while the foregoing embodiments, including the present embodiment, use the digital composite machine (the image forming apparatus) as an example of the electronic apparatus, the present invention is, of course, not limited to that example. The electronic apparatus could be a personnel computer in another example. Alternatively, if various machines used in private or in business are electronically controlled, and are able to be connected to the Internet, it is possible to sufficiently employ the management system for the electronic apparatus of the present invention in that setting as well.

As discussed above, an electronic apparatus (1, 1c, 100) of the present invention is an electronic apparatus which has a specific function and which is provided with (I) an apparatus communications section (11, 51) for transmitting an electronic mail to a predetermined receiving end (2, 4, 7, 8, 200) that is linked with the apparatus communication section via a network (3, 6), (II) an operation information preparation section (13, 21, 52), including an operation condition checking section (13, 21, 52) for checking an operational condition of a specific function after the electronic apparatus is serviced, and a preparation section (13, 21, 52) for preparing operational information that indicates the operational condition that has been checked by the operation condition checking section, and (III) control section (12, 53) (a) for controlling the operation information preparation section so as to prepare the operational information after operation of the specific function is resumed following a provision of the service, and (b) for controlling the apparatus communications section so as to transmit the operational information to the predetermined receiving end.

With the above arrangement, after the operation of the specific function is resumed following service of the electronic apparatus, the operational information preparation section prepares the operational information, so that the control section controls the apparatus communications section to transmit the operational information to the predetermined receiving end via E-mail. Therefore, if a manager, who manages the electric apparatus (such as the service center or the service personnel), is set as the receiving end for the operational information, it is possible to surely check whether the service restored the operation of the electronic apparatus sufficiently to operate its function adequately, and whether the appropriate service has been provided. Moreover, it is also possible to promptly respond to a trouble condition/event, if any, following the provision of the service, thereby improving the serviceability of the electronic device.

As discussed above, an electronic apparatus (1, 1c, 100) of the present invention is provided with (I) apparatus communications section (11, 51) for transmitting an electronic mail to a predetermined receiving end (2, 4, 7, 8, 200) that is linked with the apparatus communication section via a network (3, 6), (II) an operation information preparation section (13, 21, 52), including an operation condition checking section (13, 21, 52) for checking the operational condition of, as a specific function, a part of the electronic apparatus, which has been renewed, after the renewal of the part, and a preparation section (13, 21, 52) for preparing operational information that indicates the operational condition that has been checked by the operation condition checking section, and (III) control section (12, 53) (a) for controlling the operational information preparation section so as to prepare the operational information following operation of the specific function resumed after the renewal of the part, and (b) for controlling the apparatus communications section so as to transmit the operational information to the predetermined receiving end.

With the above arrangement, similarly to the electronic apparatus discussed previously, after the operation of the function (the specific function) of the part is resumed after the part is renewed, the operational information preparation section prepares the operational information, which indicates the operation of the specific function, so that the control section controls the apparatus communications section to transmit the operational information to the predetermined receiving end via E-mail. Therefore, if a manager, who manages the electric apparatus (such as the service center or the service personnel), is set as the receiving end for the operational information, it is possible to surely check whether the electronic apparatus becomes fully workable as a result of the renewal of the part. Moreover, it is also possible to promptly respond to a trouble condition/event, if any, even following the renewal of the part, thereby improving the serviceability of the electronic apparatus.

As discussed above, an electronic apparatus (1, 1c 100) of the present invention, which is capable of expanding its function by an optional unit (101 to 104) attached to the electronic apparatus, is provided with (I) apparatus communications section (11, 51) for transmitting an electronic mail to a predetermined receiving end (2, 4, 7, 8, 200) that is linked with the apparatus communications section via a network (3, 6), (II) detecting section (17) for detecting the attachment of the unit, (III) operation information preparation section (13, 21, 52), including an operation condition checking section (13, 21, 52) for checking the operational condition of, as a specific function, a function of the unit, which has been attached, and preparation section (13, 21, 52) for preparing operational information that indicates the operational condition that has been checked by the operation condition checking section, and (IV) control section (12, 53) (a) for controlling the operational information preparation section so as to prepare the operational information after the attachment of the unit is detected and operation of the specific function is resumed, and (b) for controlling the apparatus communications section so as to transmit the operational information to the predetermined receiving end.

With the above arrangement, similarly to the electronic apparatuses discussed previously, after the operation of the function (the specific function) expanded by the unit is resumed after the unit is attached, the operational information, which indicates the operation of the function is transmitted to the predetermined receiving end via E-mail. Therefore, if a manager, who manages the electric apparatus (such as the service center or the service personnel), is set as the receiving end for the operational information, it is possible to surely check whether the function expanded by the unit is fully workable. Moreover, it is also possible to promptly respond to a trouble condition/event, if any, after the attachment of the unit, thereby improving the serviceability of the electronic apparatus.

Meanwhile, when the user of the specific function is set as the receiving end, it is possible to use E-mail to notify the user that the specific function is available. In this way, it is possible to notify the user in a timely manner that the specific function of the electronic apparatus is expanded, thereby effectively encouraging the user to use the specific function. Moreover, it is expected that a trouble condition/event can be detected early because the user consciously checks for trouble conditions/events.

In addition to the above arrangements, the electronic apparatus of the present invention may be so arranged that (I) the detecting section is capable of detecting a renewed unit among the units that has been attached, (II) the operational information preparation section prepares the operational information that indicates the operational condition of, as the specific function, the function of the unit which has been renewed and thus newly attached, and (III) the control section controls the operational information preparation section so as to prepare the operational information, after operation of the specific function is resumed.

With the above arrangement, when some of the units attached to the electronic apparatus are renewed, for example, because of a version upgrade or a trouble condition/event, if a manager, who manages the electric apparatus (such as the service center or the service personnel), is set as the receiving end for the operational information, it is possible to surely check whether the function, which is resumed by the renewal of the unit, is fully workable. Moreover, it is also possible to notify the user, who uses the function, in a timely manner that the operation of the function which has been temporally stopped during the renewal is resumed after the completion of the renewal. In this way, the user is efficiently encouraged to utilize the function. Moreover, it is expected that a trouble conditions/events can be detected early because the user, who is notified of the renewal of the unit, consciously checks for trouble conditions/events.

In addition to the above arrangements, the electronic apparatus of the present invention may be so arranged that the operational information preparation section includes (I) a self-diagnosis section (13, 52) for diagnosing condition of the electronic apparatus so as to prepare a self-diagnosis result, and (II) the control section (a) controls the self-diagnosis section so as to diagnoses the condition of the electronic apparatus following the provision of a service of the renewal of the part, or the attachment of the unit, and (b) controls the apparatus communications section so as to transmit the self-diagnosis result as the operational information to the predetermined receiving end.

With the above arrangement, after the provision of a service, the renewal of the part, or the attachment of the unit, the self-diagnosis section diagnoses whether the operational condition of the specific function of the electronic apparatus is above an appropriate level, whether the electronic apparatus operates in the appropriate operational condition, or how the operational condition of the electronic apparatus is after the electronic apparatus is operated for a predetermined period. Thereafter, the control section controls the apparatus communications section so as to transmit, via E-mail, the self-diagnosis result as the operational information to the predetermined receiving end, such as a manager (for instance, the service center) who manages the electronic apparatus. In this way, it is possible for the electronic apparatus to automatically check the operational condition of the electronic apparatus following the provision of a service, the renewal of the part, or the attachment of the unit. Meanwhile, in accordance with the confirmation result, it is possible to respond instantly, if necessary, thereby improving the serviceability of the electronic apparatus.

In addition to the above arrangements, the electronic apparatus of the present invention may be so arranged that (I) the self-diagnosis section supervises the operational condition until a predetermined condition is satisfied, and (II) the control section controls the apparatus communications section so as to transmit the self-diagnosis result as the operational information, irrespective of whether or not the predetermined condition is satisfied, in case the self-diagnosis section detects a trouble condition/event.

With the above arrangement, in case a trouble condition/event is caused, the electronic apparatus transmits the self-diagnosis result as the operational information, irrespective of whether the predetermined condition is satisfied or not. In this way, it is possible to respond promptly to a trouble condition/event because the receiving end can be timely notified of the occurrence of the trouble condition/event, without bothering the user of the electronic apparatus.

In case service is provided, or a part or a unit is renewed because of a trouble condition/event, the user of the electronic apparatus hopes the trouble condition/event is solved, if possible. Even if the trouble condition/event cannot be fully solved, the user requests that the condition resulting from the trouble condition/event be improved. Therefore, if service or a renewal of a part or a unit made the previous condition of the electronic apparatus worse, the user would be more dissatisfied, and would lead to lose confidence in the service center or service personnel, if no measures to correct the problem were taken.

Therefore, in addition to the above arrangements, the electronic apparatus of the present invention may be so arranged that the control section changes a predetermined condition in accordance with a condition of trouble at a time when service is provided, when a part is renewed, or when a unit is renewed.

With the above arrangement, in accordance with a condition of trouble, the period during which the self-diagnosis section supervises the operational condition of a specific function is changed. Therefore, where the supervision period is set to be long enough to surely detect an increase in the frequency of the occurrence of a trouble condition/event, in a case in which the trouble condition/event occurs more frequently, and the operational information is transmitted when the trouble condition/event is detected, it is possible to promptly respond to the trouble condition/event. This is because it is possible to be timely notified that the occurrence frequency of the trouble condition/event is increased from a previous level. Moreover, in a case in which no operational information is received, it is possible to assure that the occurrence frequency of a trouble condition/event is, at least, less than a previous level thereof, thereby clearly demonstrating to a user the effect of a service, a renewal of a part, or a renewal of a unit. As a result, it is possible to establish a management system for the electronic apparatus, which can win the confidence of a user and demonstrate the reliability of the electronic apparatus to the user.

In addition to the above arrangements, the electronic apparatus of the present invention may be so arranged that the operational information preparation section prepares the operational information in accordance with the operational condition of a specific function that has been carried out until that predetermined condition is satisfied.

With the above arrangement, the operational information, which indicates the operational condition of a specific function, is prepared after the specific function is operated until a specific condition is satisfied following a provision of a service. Therefore, the operational information appropriately explains the operational condition of the specific condition. In this way, it is possible to provide more appropriate service.

In addition to the above arrangements, the electronic apparatus of the present invention may be so arranged that a predetermined condition is at least one of (a) a number of times that a specific function is operated following a provision of a service, a renewal of a part, or an attachment of a unit, and (b) a quantum of time passed since a provision of a service, a renewal of a part, or an attachment of a unit.

The electronic apparatus tends to have various troubles, after a provision of a service, a renewal of a part, or an attachment of a unit, according how frequently the electronic apparatus is used. With the above arrangement, however, it is possible to more promptly respond to a trouble condition/event because the operational information is prepared and transmitted to a predetermined receiving end every time the operation is carried out in a certain number of times. Moreover, instead of the frequency of the usage, there are some cases in which the passage of time makes various parts inferior or ineffective. Therefore, it is possible to more promptly respond to a trouble condition/event, with the above arrangement where the operational information is prepared and transmitted to a receiving end every time a certain period of time is passed following a provision of a service, a renewal of a part, or an attachment of a unit.

In addition to the above arrangements, the electronic apparatus of the present invention may be so arranged that a predetermined condition is changeable.

Depending how the electronic apparatus is used, the frequency and period of usage may be different. Therefore, the electronic apparatus is so arranged that a predetermined condition is changeable depending on how the user uses the electronic apparatus. In this way, it is possible to more surely prepare the operational information, thereby making it possible to more promptly respond to a trouble condition/event.

In addition to the above arrangements, the electronic apparatus of the present invention may be so arranged that, when plural parts are renewed or plural units are attached, the operational information is prepared in accordance with the operational condition of a specific function of each part or unit, when all predetermined conditions of the respective parts or units are satisfied.

With this arrangement, it is possible to transmit, at the same time, all pieces of operational information related to all the plural parts or units, even if the plural parts are renewed or plural units are attached and each of the parts or units has a different timing at which a predetermined condition associated therewith is satisfied. As a result, the receiving end can easily proceed to a next step, referring to pieces of operational information that have been transmitted. For example, the receiving end can stop while the operational condition following a renewal of parts or an attachment of a unit is determined, so as to proceed to the stage of charging the cost of the service performed to the user. Moreover, in the case of an arrangement where, at the time the operational information is prepared, the user is requested to determine whether the trouble condition/event has been solved, the user may be requested to determine how many times the operational information is transmitted separately every time a predetermined condition is satisfied. However, if all the pieces of the operational condition are transmitted at once, the user may not be requested to make this determination as many times, thereby improving the serviceability of the electronic apparatus.

In addition to the above arrangements, the electronic apparatus of the present invention may be so arranged that the operational information preparation section, at least, includes display section (21*b*) capable of displaying information and input section (21) capable of receiving information, and (II) the control section (a) controls the display section so as to display a message seeking input information concerning whether or not the condition of the electronic apparatus is adequate following a provision of a service a renewal of the part, or an attachment of a unit, by means of the input section, and (b) controls the apparatus communications section so as to transmit, as the operational information as an inputted result that has been inputted by means of the input section, to a predetermined receiving end.

With the above arrangement, after the provision of a service, a renewal of a part, or an attachment of a unit with respect to the electronic apparatus, the user determines whether the specific function of the electronic apparatus operates properly, whether the electronic apparatus operates properly, or how electronic apparatus operates after the electronic apparatus has been operated for a predetermined period. Thereafter, an input result based on the user's determination, as the operational information, is transmitted via E-mail to a predetermined receiving end such as a manager (such as service center) who manages the electronic apparatus. In this way, it is possible to surely check whether the electronic apparatus becomes fully workable as a result of the performance of a service, a renewal of a part, or an attachment of a unit, and whether a service, a renewal of a part, or an attachment of a unit is appropriate. In addition, it is possible to promptly respond to a trouble condition/event, if any, thereby improving the serviceability of the electronic apparatus.

In addition to the above arrangements, the electronic apparatus of the present invention may be so arranged that only in case the operational information preparation section prepares operational information that indicates an inadequate operational condition of the electronic apparatus, the control section controls the apparatus communication section so as to transmit the operational information to a predetermined receiving end.

With the above arrangement, a manager (such as the service center) is notified of the operational condition (operational information) of the electronic apparatus, only in those cases in which the operational information preparation section prepares operational information that indicates an operational condition that requires additional service, that is, an inadequate operational condition. This is because an adequate operational condition requires no additional service, while an inadequate operation condition requires further service. In this way, it is possible to promptly respond to a trouble condition/event, if any, thereby further improving the serviceability of the electronic apparatus.

In addition to the above arrangements, the electronic apparatus of the present invention may be so arranged that, when the operational information preparation section prepares operational information that indicates an inadequate operational condition of the electronic apparatus, the control section (a) controls the apparatus communications section so as to transmit the operational information to a predetermined receiving end, and (b) controls parts of the electronic apparatus, which cause the inadequate operation condition, so as to temporarily stop the operation of the electronic apparatus.

With the above arrangement, when an additional service is required due to an inadequate operational condition, the parts which cause the inadequate operational condition are stopped, while the operational information is transmitted to a manager (such as the service center). This avoids the part, which causes the trouble condition/event from being operated continuously, thereby preventing additional problems such as a worsening the previous trouble condition/event or an adverse impact on other parts of the electronic device.

In addition to the above arrangements, the electronic apparatus of the present invention may be so arranged that the control section includes a trouble notifying section (1, 21*b*, 51) for notifying a user of the unavailability of a specific function, when a part of the electronic apparatus which caused the inadequate operational condition is temporarily prevented from operating.

With the above arrangement, when a part of the electronic apparatus is temporarily stopped so that its specific function is unavailable, the trouble notifying section notifies the user. As a result, a user who intends to use the specific function is notified in a timely and efficient manner that the specific function is unavailable. In addition, it is also possible to recommend the user that he temporarily use an alternative apparatus.

In addition to the above arrangement, the electronic apparatus of the present invention may be so arranged that the electronic apparatus is an image forming apparatus.

Because image forming apparatuses, such as a photocopying machine, require intensive service, it is preferable to employ the image forming apparatus as the electronic apparatus of the present invention, in accordance with the above arrangement.

In addition to the above arrangements, an electronic apparatus of the present invention may be further provided with a notifying section (11, 21*b*, 51) for notifying a user the status of the operational condition of the specific function which has been checked by the operational condition checking section, after the operation of that specific function has been resumed or started.

With the above arrangement, the notifying section notifies the user concerning how the specific function operates, so that a user, who intends to use the function, is notified in a timely and efficient manner when that specific function becomes available, is resumed, or becomes unavailable.

In addition to the above arrangement, the electronic apparatus of the present invention may be so arranged that the notifying section notifies a user, who uses a specific function, at a time the operational condition of that function is checked as normal by the operation condition checking section, as well as after the operation of the specific function is resumed or started.

With the above arrangement, when the normal operation of a specific function is resumed, the notifying section notifies the user that that specific function is available (or has resumed its availability). In this way, a user who intends to use the specific function is notified in a timely and efficient manner that the specific function has become available or resumed, thereby encouraging the user to use the specific function.

In addition to the above arrangements, the electronic apparatus of the present invention may be so arranged that a predetermined receiving end includes each user (7) of a specific function.

With the above arrangement, even in case wherein the user of the electronic apparatus is distant from the location of the electronic apparatus (for example, when the electronic apparatus is used as a network printer) the operational information is transmitted to the user so that the user is notified in a timely and efficient manner that the specific function is available, is resumed or has become unavailable.

In addition to the above arrangement, the electronic apparatus of the present invention may be so arranged that, in order to transmit the operational information that indicates the operational condition, the control section selects a receiving end in accordance with the operational condition of the specific function checked by the operation condition checking section.

With the above arrangement, where the receiving end of the operational information is selected in accordance with the operation condition of the specific function, it is possible to flexibly select the receiving end for the operational information, in accordance with the operational condition. For example, the service center, a manager of the network including the electronic apparatus, or a user of the electronic apparatus may be selected as the receiving end for the operational information in accordance with the operational condition. As a result, with respect to each operational condition, it is possible for the person or the apparatus that needs to understand the operational condition, to understand the operational condition promptly and precisely, in accordance with the operational information received by the person or the apparatus. In this way, even if a trouble condition/event occurs, it is possible to respond in an efficient and timely manner.

In the above arrangement when the function of the electronic apparatus has been expanded by the attachment of a unit, (for example, where a printer board, as the unit, is attached to the image forming apparatus so that the image forming apparatus operates as a network printer, or where an automatic document feeder is attached to the image forming apparatus so as to be able to carry out continuous photocopying) a different function is expanded depending on which unit is attached. Accordingly, a different receiving end for the operation information may have to be selected.

Therefore, in addition to the above arrangements, the electronic apparatus of the present invention may be so arranged that the control section selects the receiving end for the operational information, depending on which unit is attached.

With the above arrangement, where the control section selects the receiving end for the operation information, depending on which unit is attached, it is possible to transmit the operational information to the receiving end in accordance with the unit attached, even when a different receiving end should be selected for the operational information because the function expanded by the unit attached is quite different. As a result, each receiving end can acquire the operational information in a timely and efficient manner, and thereby may promptly select a suitable service.

As discussed previously, an information communications apparatus (5) of the present invention, which is capable of being externally connected with an electronic apparatus (1c) having a specific function, is provided with (I) communication section (51), connected with a network (3, 6), that is capable of transmitting information to a predetermined receiving end (2, 4, 7, 8, 200) via electronic mail, and (II) control section (53) for controlling the transmission of the information in accordance with operation of the Electronic apparatus, and (III) operation information preparation section (21, 52) for preparing operational information that indicates the operational condition of the electronic apparatus, wherein the control section (a) controls the operational information preparation section so as to prepare the operational information after operation of the specific function is resumed following the provision of service to the electronic apparatus, and (b) controls the communication section so as to transmit the operational information to the predetermined receiving end.

With the above arrangement, after the operation of a specific function is resumed following, a provision of service to the electronic apparatus, the operational information preparation section prepares the operational information so that the control section transmits the operational information to a predetermined receiving end via E-mail. Therefore, if a manager who manages the electronic apparatus is set as the receiving end for the operational information, it is possible to check whether or not the service was appropriate. It also is possible to promptly respond to a trouble condition/event, if any. Therefore, the serviceability of the electronic apparatus is improved.

This is particularly the case because the information communications apparatus can be attached externally to the electronic apparatus, and it therefore becomes possible to use the management system to manage an electronic apparatus having no operational information preparation function.

In addition to the above arrangements, the management system for the electronic apparatus of the present invention is provided with (I) a predetermined receiving end, and (II) the electronic apparatus has an operational information preparation section. Alternatively, the management system for the electronic apparatus of the present invention is provided with (I) a predetermined receiving end, (II) the electronic apparatus, and (III) an information communications apparatus.

In the above arrangement, the management system for the electronic apparatus is constructed with (I) a predetermined receiving end, and (II) an electronic apparatus having an operational information preparation section, or with (I) a predetermined receiving end, (II) the electronic apparatus, and (III) an information communication apparatus. This realizes a management system that can automatically transmit various information helpful in the provision of technical services, especially for an electronic apparatus (such as an image forming apparatus) that requires complicated technical service by trained service personnel to solve a trouble condition/event.

In addition to the above arrangements, the management system for the electronic apparatus of the present invention may be so arranged that a predetermined receiving end includes a primary receiving end (4, 200) for receiving the operational information directly from the electronic apparatus, and a secondary receiving end (2) to which the primary receiving end can transmit instruction information as to the service to be provided.

With the above arrangement, it further is possible to use E-mail so as to forward to the secondary receiving end the operational information that has been transmitted to the primary receiving end, and to transmit to the secondary receiving end newly prepared information for the secondary receiving end. In other words, the primary receiving end is used as a gateway so that the operational information is received at the primary receiving end first, and is transmitted to a secondary receiving end that is a terminal. Thus, if the service center is set as the primary receiving end, while the service personnel is set as the secondary receiving end, the primary receiving end can surely manage the operational condition of the electronic apparatus, while the secondary receiving end can systematically determine what the operational condition of the electronic apparatus is. Therefore, it is possible to appropriately respond to a trouble condition/event, thereby further improving the serviceability of the electronic apparatus.

In addition to the above arrangements, the management system for the electronic apparatus of the present invention may be so arranged that the primary receiving end charges a cost of the service when operational information is received indicating adequate operation of the electronic apparatus following the provision of service.

With the above arrangement, the cost of the service is charged on condition that the electronic apparatus has been properly serviced. Therefore, the cost is charged in a manner clear to both the manager and the user.

As discussed previously, a management method for an electronic apparatus of the present invention includes the steps of (I) preparing operational information that indicates operational condition of the electronic apparatus (1, 1c 100), after operation of a specific function of the electronic apparatus is resumed following the provision of service to the electronic apparatus, and (II) transmitting to a predetermined receiving end the operational information, at least as a judgment reference for determining whether or not it is necessary to repeat the service, wherein the electronic apparatus (1, 1c, 100) has a specific function, and is linked with a predetermined receiving end (2, 4, 7, 8, 200) via network (3, 6) so that the electronic apparatus is capable of transmitting information to the receiving end via electronic mail.

With the above method, it is possible for a predetermined receiving end to check anytime whether or not the electronic apparatus has been serviced appropriately. Therefore, if a manager, who manages the electronic apparatus, is set as the predetermined receiving end, the manager can always properly respond to a trouble condition/event, if any. In this manner, it is possible to more surely manage the operational condition of the electronic apparatus, thereby improving the serviceability of the electronic apparatus.

The invention being thus described, it will be obvious that the same way may be varied in many ways. Such variations are not to be regarded as a departure from the spirit and scope of the invention in its broadest aspects, and all such modifications as would be obvious to one skilled in the art are intended to be included within the scope of the following claims.

What is claimed is:

1. An electronic apparatus having a specific function and being capable of receiving service that cannot be remotely or automatically performed which adjusts the performance of the specific function from at least one servicing entity, comprising:

communication means for transmitting an electronic mail to a predetermined receiving end linked with said electronic apparatus via a network, the predetermined receiving end in each instance of a receipt of service by said electronic apparatus being the one of said at least one servicing entity that provided the received service;

operational information preparation means for preparing operational information indicative of whether or not the specific function has been successfully executed; and control means (a) for controlling said operational information preparation means so as to prepare the operational information after the specific function has been resumed by the electronic apparatus following a provision of a service that cannot be automatically or remotely performed thereto, and (b) for controlling said communication means so as to transmit the operational information to said predetermined receiving end;

wherein:

said service that cannot be remotely or automatically performed generically includes procedures carried out in connection with the specific function of the electronic apparatus which consist of elements of at least one of:
(a) repair,
(b) check,
(c) cleaning,
(d) uninstallation and installation of a unit subject to repair, check or cleaning,
(e) replacement of a consumable or an exchange, and
(f) replacement or installation of a unit which extends the specific function;

the operational information preparation means tries execution of the specific function after said received service has been provided thereto and generates an operational information indicative of whether or not the specific function has been executed properly, the control means causes the communication means to send the operational information indicative of whether or not the serviced specific function has been executed properly to the predetermined receiving end as a voluntary information supplement without a receipt of a request therefor from the predetermined receiving end, and if the serviced specific function has not been executed properly, in order to have improper service corrected, the control means causes the communication means to send the operational information to the predetermined receiving end.

2. The electronic apparatus as set forth in claim 1, wherein:

said operational information preparation means includes self-diagnosis means for diagnosing an operational condition of said electronic apparatus so as to prepare a self-diagnosis result, and said control means (a) controls said self-diagnosis means so as to diagnose the operational condition of said electronic apparatus following said provision of said service, and (b) controls said communication means so as to transmit the self-diagnosis result as operational information to said predetermined receiving end.

3. The electronic apparatus as set forth in claim 2, wherein:

said self-diagnosis means supervises said operational condition until a predetermined condition precedent to a preparation of said operational condition information is satisfied, and said control means controls said apparatus communication means so as to transmit the self-diagnosis result as said operational information, irrespective of whether or not said predetermined condition is satisfied, in those cases in which said self-diagnosis means detects an event adversely impacting upon the normal operation of said electronic apparatus, i.e., a trouble condition.

4. The electronic apparatus as set forth in claim 3, wherein said control means changes the predetermined condition in accordance with said trouble condition at a time when said service is provided.

5. The electronic apparatus as set forth in claim 3, wherein the predetermined condition is at least one of (a) the number of times that the specific function has been repeated following said provision of said service, and (b) the amount of time that has passed since said service was provided.

6. The electronic apparatus as set forth in claim 3, wherein said operational information preparation means prepares operational information in accordance with the operational condition of the specific function that has been carried out until the predetermined condition precedent is satisfied.

7. The electronic apparatus as set forth in claim 6, wherein the predetermined condition precedent is at least one of (a) the number of times that the specific function has been operated following the provision of said service, and (b) the amount of time that has passed since the provision of said service.

8. The electronic apparatus as set forth in claim 6, wherein the predetermined condition is changeable.

9. The electronic apparatus as set forth in claim 6, wherein, in case plural parts or units are replaced in the course of service, the operational information is prepared in accordance with the operational condition of a specific function of each part or unit, when all the predetermined conditions precedent of the respective parts or units are satisfied.

10. The electronic apparatus as set forth in claim 1, wherein in case plural parts or units are replaced in the course of said service, the operational information is prepared in accordance with the operational condition of a specific function of each part or unit, and when all predetermined conditions of the respective parts or units are satisfied, said predetermined conditions each constitute a boundary point at which supervision of the operational condition of a specific function is stopped.

11. The electronic apparatus as set forth in claim 1, wherein:
said operational information preparation means, at least includes (1) display means capable of displaying information and (2) input means capable of receiving information, and
said control means (a) controls said display means so as to display a message seeking input information as to whether said service has been properly performed after the provision of said service, by means of said input means, and (b) controls said communication means so as to transmit, as the operational information, an inputted result, which has been inputted by means of said input means, to said predetermined receiving end.

12. The electronic apparatus as set forth in claim 1, wherein, only in case said operational information preparation means prepares operational information that indicates that said service has not been properly performed, said control means controls said communication means so as to transmit the operational information to said predetermined receiving end.

13. The electronic apparatus as set forth in claim 1, wherein in case said operational information preparation means prepares operational information that indicates that said service has not been properly performed, said control means (a) controls said communication means so as to transmit the operational information to said predetermined receiving end, and (b) controls said electronic apparatus such that the operation of at least a serviced part of said electronic apparatus is stopped until such time as said serviced part receives further service that cannot be remotely or automatically performed.

14. The electronic apparatus as set forth in claim 13, wherein said control means includes means for notifying a user, who uses the specific function, of an event adversely impacting upon the use of the electronic apparatus and the unavailability of the specific function, when said at least a serviced part of said electronic apparatus is stopped until such time as said serviced part receives further service that cannot be remotely or automatically performed.

15. The electronic apparatus as set forth in claim 1, wherein said electronic apparatus is an image forming apparatus.

16. The electronic apparatus as set forth in claim 1, wherein the communication means transmits electronic mail to each user of the specific function at the predetermined receiving end.

17. The electronic apparatus as set forth in claim 1, wherein the operational information preparation means includes an operation condition checking section for checking whether or not the specific function has been successfully executed.

18. An electronic apparatus as set forth in claim 17, further comprising notifying means for notifying a user, who uses a specific function, of the operational condition which has been checked by said operational condition checking section, after the operation of the specific function is resumed following said service.

19. The electronic apparatus as set forth in claim 18, wherein said notifying means notifies a user, who uses the specific function, at a time the operational condition checked by said operation condition checking section indicates normal operation, after the operation of the specific function is resumed following said service.

20. The electronic apparatus as set forth in claim 17, wherein, in order to transmit operational information that indicates the operational condition, said control means selects said receiving end in accordance with the operational condition of the specific function checked by said operational condition checking section.

21. The electronic apparatus as set forth in claim 1, wherein the said service is an expansion of function by the addition of additional functional units, and Said electronic apparatus further comprises detecting means capable of detecting the attachment of an additional functional unit thereto.

22. The electronic apparatus as set forth in claim 21, wherein:
said operational information preparation means prepares operational information that indicates the operational condition of the electronic apparatus, as a specific function of said additional functional unit; and
said control means controls said operational information preparation means so as to prepare the operational information after operation of the specific function is resumed following said service.

23. The electronic apparatus as set forth in claim 21, wherein said control means selects said receiving end for the operational information, depending on what additional unit is attached.

24. The electronic apparatus as set forth in claim 1, further comprising a response memory for storing a response table indicative of a correspondence between:
(a) a reason the specific function cannot be properly executed, and
(b) the receiving end that is responsible for the reason;
wherein, in case the serviced specific function cannot be properly executed at present, the control means reads the receiving end in accordance with the reason from the response memory, and controls the communication means so as to transmit the operational information to the read receiving end.

25. A management system for an electronic apparatus, comprising:
a predetermined receiving end,
said electronic apparatus having a specific function and being capable of receiving service that cannot be remotely or automatically performed which adjusts the performance of the specific function from at least one servicing entity, said electronic apparatus including:

communication means for transmitting electronic mail to said predetermined receiving end that is linked with said communication means via a network, the predetermined receiving end in each instance of a receipt of service by said electronic apparatus being the one of said at least one servicing entity that provided the received service;

operational information preparation means, having
(1) an operational condition checking section for checking operational condition of the specific function after said electronic device is serviced, and
(2) a preparation section for preparing operational information indicative of whether or not the specific function has been successfully executed; and control means (a) for controlling said operational information preparation means so as to prepare the operational information after the specific function has been resumed following a provision of said service, and (b) for controlling said communication means so as to transmit the operational information to said predetermined receiving end;

wherein:
said service that cannot be remotely or automatically performed generically includes procedures carried out in connection with the specific function of the electronic apparatus which consists of elements of at least one of:
(a) repair,
(b) check,
(c) cleaning,
(d) uninstallation and installation of a unit subject to repair, check or cleaning,
(e) replacement of a consumable or an exchange, and
(f) replacement or installation of a unit which extends the specific function;

the operational information preparation means tries execution of the specific function after said received service has been provided thereto and generates an operational information indicative of whether or not the specific function has been executed properly, the control means causes the apparatus communication means to send the operational information indicative of whether or not the serviced specific function has been executed properly to the predetermined receiving end as a voluntary information supplement without a receipt of a request therefor from the predetermined receiving end, and if the serviced specific function has not been executed properly, in order to have improper service corrected, the control means causes the communication means to send the operational information to the predetermined receiving end.

26. The management system for said electronic apparatus as set forth in claim 25, wherein said predetermined receiving end includes a primary receiving end for receiving the operational information directly from said electronic apparatus, and a secondary receiving end to which said primary receiving end can transmit instruction information as to said service.

27. The management system as set forth in claim 25, wherein said electronic apparatus is an image forming apparatus.

28. An information communications apparatus capable of being externally connected with an electronic apparatus having a specific function and being capable of receiving service that cannot be remotely or automatically performed which adjusts the performance of the specific function from at least one servicing entity, comprising:

communication means, connected with a network, being capable of transmitting information to a predetermined receiving end by electronic mail, the predetermined receiving end in each instance of a receipt of service by said electronic apparatus being the one of said at least one servicing entity that provided the received service;

control means for controlling the transmission of the information in accordance with operation of said electronic apparatus; and operational information preparation means for preparing operational information that indicates whether or not the specific function has been successfully executed by said electronic apparatus, wherein said control means (a) controls said operational information preparation means so as to prepare the operational information after said electronic apparatus is serviced, and (b) controls said communication means so as to transmit the operational information to said predetermined receiving end; and wherein:
said service that cannot be remotely or automatically performed generically includes procedures carried out in connection with the specific function of the electronic apparatus which consists of elements of at least one of:
(a) repair,
(b) check,
(c) cleaning,
(d) uninstallation and installation of a unit subject to repair, check or cleaning,
(e) replacement of a consumable or an exchange, and
(f) replacement or installation of a unit which extends the specific function;

the operational information preparation means tries execution of the specific function after said received service has been provided thereto and generates an operational information indicative of whether or not the specific function has been executed properly, the control means causes the apparatus communication means to send the operational information indicative of whether or not the serviced specific function has been executed properly to the predetermined receiving end as a voluntary information supplement without a receipt of a request therefor from the predetermined receiving end, and if the serviced specific function has not been executed properly, in order to have improper service corrected, the control means causes the communication means to send the operational information to the predetermined receiving end.

29. A management system for an electronic apparatus, comprising:
a predetermined receiving end;
said electronic apparatus having specific functions and being capable of receiving service that cannot be remotely or automatically performed which adjusts the performance of the specific functions from at least one servicing entity; and
an information communications apparatus capable of being externally connected with said electronic apparatus, said communication apparatus including:
communication means, connected with a network, being capable of transmitting information to said predetermined receiving end by electronic mail, the predetermined receiving end in each instance of a receipt of service by said electronic apparatus being the one of said at least one servicing entity that provided the received service;

control means for controlling the transmission of the information in accordance with operation of said electronic apparatus, and operational information preparation means for preparing operational information that indicates whether or not the specific function has been executed by said electronic apparatus, wherein said control means (a) controls said operational information preparation means so as to prepare the operational information after operation of the specific function is resumed after said electronic apparatus is serviced, and (b) controls said communication means so as to transmit the operational information to said predetermined receiving end; and wherein:

said service that cannot be remotely or automatically performed generically includes procedures carried out in connection with the specific function of the electronic apparatus which consist of elements of at least one of:

(a) repair,
(b) check,
(c) cleaning,
(d) uninstallation and installation of a unit subject to repair, check or cleaning,
(e) replacement of a consumable or an exchange, and
(f) replacement or installation of a unit which extends the specific function;

the operational information preparation means tries execution of the specific function after said received service has been provided thereto and generates an operational information indicative of whether or not the specific function has been executed properly, the control means causes the apparatus communication means to send the operational information indicative of whether or not the serviced specific function has been executed properly to the predetermined receiving end as a voluntary information supplement without a receipt of a request therefor from the predetermined receiving end, and if the serviced specific function has not been executed properly, in order to have improper service corrected, the control means causes the communication means to send the operational information to the predetermined receiving end.

30. The management system for said electronic apparatus as set forth in claim 29, wherein said predetermined receiving end includes a primary receiving end for receiving the operational information directly from said electronic apparatus, and a secondary receiving end to which said primary receiving end can transmit instruction information as to said service.

31. The management system for said electronic apparatus as set forth in claim 30, wherein the service expansion function is achieved by the addition of additional functional units to said electronic apparatus, and said management system further comprises detecting means capable of detecting an additional unit attached to said electronic apparatus.

32. A management method for an electronic apparatus, comprising the steps of:

preparing operational information that indicates whether or not a specific function of the electronic apparatus has been successfully executed, after operation of a specific function of said electronic apparatus is resumed after following the performance of a service that cannot be remotely or automatically performed with respect to said electronic apparatus by at least one servicing entity; and transmitting to a predetermined receiving end the operational information, at least as a judgment reference for judging whether or not it is necessary to redo said service, wherein said electronic apparatus has a specific function, that is capable of receiving said service so as to adjust a performance of the specific function, and is linked with said predetermined receiving end via network so that said electronic apparatus is capable of transmitting information to said receiving end by electronic mail, the predetermined receiving end being in each instance of a receipt of service by said electronic apparatus being the one of at least one servicing entity that provided the received service; and wherein:

said service that cannot be remotely or automatically performed generically includes procedures carried out in connection with the specific function of the electronic apparatus which consist of elements of at least one of:

(a) repair,
(b) check,
(c) cleaning,
(d) uninstallation and installation of a unit subject to repair, check or cleaning,
(e) replacement of a consumable or an exchange, and
(f) replacement or installation of a unit which extends the specific function;

an operational information preparation means tries execution of the specific function after said received service has been provided thereto and generates an operational information indicative of whether or not the specific function has been executed properly, a control means causes an apparatus communication means to send the operational information indicative of whether or not the serviced specific function has been executed properly to the predetermined receiving end as a voluntary information supplement without a receipt of a request therefor from the predetermined receiving end, and if the serviced specific function has not been executed properly, in order to have improper service corrected, the control means causes the communication means to send the operational information to the predetermined receiving end.

* * * * *

UNITED STATES PATENT AND TRADEMARK OFFICE
CERTIFICATE OF CORRECTION

PATENT NO. : 7,373,382 B2 Page 1 of 1
APPLICATION NO. : 09/969407
DATED : May 13, 2008
INVENTOR(S) : Yasuhiro Nakai et al.

It is certified that error appears in the above-identified patent and that said Letters Patent is hereby corrected as shown below:

On the cover page item [54] and col. 1, the Title of the Invention should be substituted for the deleted incorrect Title of the Invention as shown below:

-- ELECTRONIC APPARATUS AND INFORMATION COMMUNICATION APPARATUS, MANAGEMENT SYSTEM AND MANAGEMENT METHOD FOR USE WITH ELECTRONIC APPARATUS --

Signed and Sealed this

Seventh Day of October, 2008

JON W. DUDAS
*Director of the United States Patent and Trademark Office*